(12) United States Patent
Watté et al.

(10) Patent No.: US 12,399,324 B2
(45) Date of Patent: Aug. 26, 2025

(54) MULTIPLE FIBER CONNECTIVITY BASED ON 2-PHOTON, 3D PRINTED, TAPERED FIBER TIPS

(71) Applicant: COMMSCOPE TECHNOLOGIES LLC, Hickory, NC (US)

(72) Inventors: Jan Watté, Grimbergen (BE); Vivek Panapakkam Venkatesan, Leuven (BE); Saurav Kumar, Ghent (BE); Koen Vanmol, Vilvoorde (BE); Jürgen Albert Jan Van Erps, Tervuren (BE); Hugo Thienpont, Gooik (BE)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 92 days.

(21) Appl. No.: 17/913,754

(22) PCT Filed: Mar. 23, 2021

(86) PCT No.: PCT/US2021/023744
§ 371 (c)(1),
(2) Date: Sep. 22, 2022

(87) PCT Pub. No.: WO2021/195121
PCT Pub. Date: Sep. 30, 2021

(65) Prior Publication Data
US 2023/0098658 A1    Mar. 30, 2023

Related U.S. Application Data

(60) Provisional application No. 62/993,449, filed on Mar. 23, 2020, provisional application No. 63/046,479, filed on Jun. 30, 2020.

(51) Int. Cl.
*G02B 6/26* (2006.01)
*G02B 6/30* (2006.01)

(52) U.S. Cl.
CPC ............. *G02B 6/262* (2013.01); *G02B 6/305* (2013.01)

(58) Field of Classification Search
CPC .................................. G02B 6/262; G02B 6/305
See application file for complete search history.

(56) References Cited

U.S. PATENT DOCUMENTS 9,302,430 B2    4/2016   Thiel et al.
10,288,810 B2 *  5/2019   Lu ........................ G02B 6/4225
(Continued)

FOREIGN PATENT DOCUMENTS

EP    0 989 422 B1    12/2010
EP    2 795 382 B1     2/2019
(Continued)

OTHER PUBLICATIONS

International Search Report and Written Opinion of the International Searching Authority for International Patent Application No. PCT/US2021/023744 mailed Jul. 13, 2021, 10 pages.
(Continued)

*Primary Examiner* — Michael P Mooney
(74) *Attorney, Agent, or Firm* — Merchant & Gould P.C.

(57) ABSTRACT

Optical guiding elements are 3D printed on the ends of optical fibers. A multifiber connector includes fibers having 3D printed elements that are flush with the end face of the connector. The printed 3D element may be down-tapered for coupling between a single mode optical fiber and an optical chip waveguide. The cross-sectional shape of the 3D printed optical element may change along its length so as to more closely match to the mode field of a non-circular waveguide on the optical chip. The optical element may be printed with a gradient index. The optical element may be provided with
(Continued)

an output face distal from the optical fiber that is not flat and which changes the divergence of the light passing therethrough.

20 Claims, 21 Drawing Sheets

(56) References Cited

U.S. PATENT DOCUMENTS

| | | | |
|---|---|---|---|
| 2008/0197285 A1* | 8/2008 | Frey | G01J 1/02 250/336.2 |
| 2018/0281324 A1 | 10/2018 | Gießen et al. | |
| 2018/0372960 A1 | 12/2018 | Wohlfeil | |
| 2019/0331868 A1 | 10/2019 | Watte et al. | |

FOREIGN PATENT DOCUMENTS

| | | |
|---|---|---|
| JP | 2004-530927 A | 10/2004 |
| WO | 2019/165205 A1 | 8/2019 |

OTHER PUBLICATIONS

Augustin, L. et al., "Standardized Process Could Revolutionize Photonic Integration", Euro Photonics, 18: 30-34 (2013).
Billah, M.R. et al., "Hybrid integration of silicon photonics circuits and InP lasers by photonic wire bonding", Optica, 5(7): 876-883 (Jul. 2018).
Bowers, J.E. et al., "Recent Advances in Silicon Photonic Integrated Circuits", Proc. of SPIE, 9774: 1-18 (2016).
Dietrich, P.I. et al., "In situ 3D nanoprinting of free-form coupling elements for hybrid photonic integration", Nature Photonics, 12:241-247 (Apr. 2018).
Dong, P. et al., "Silicon photonic devices and integrated circuits", Nanophotonics, 3(4-5): 215-228 (2014).
Farsari, M. et al., "Two-photon fabrication", Nature Photonics, 3: 450-452 (Aug. 2009).
Gissibl, T. et al., "Spatial beam intensity shaping using phase masks on single-mode optical fibers fabricated by femtosecond direct laser writing", Optica, 3(4): 448-451 (Apr. 2016).
Gissibl, T. et al., "Sub-micrometre accurate free-form optics by three-dimensional printing on single-mode fibres", Nature Communications, (Jun. 1-9, 2016).
Gissibl, T. et al., "Two-photon direct laser writing of ultracompact multi-lens objectives", Nature Photonics, 1-7 (2016).
Kowalczyk, M. et al., "Microstructured gradient-index antireflective coating fabricated on a fiber tip with direct laser writing", Optics Express, 22(10): (May 1-6, 2014).
Lindenmann, N. et al., "Connecting Silicon Photonic Circuits to Multi-Core Fibers by Photonic Wire Bonding", Journal of Lightwave Technology, 33(4): 1-7 (2015).
Marchetti, R. et al., "Coupling strategies for silicon photonics integrated chips [Invited]", Photonics Research, 7(2):201-239 (Feb. 2019).
Milton, A.F. et al., "Mode Coupling in Optical Waveguide Horns", IEEE Journal of Quantum Electronics, QE-13(10):828-835 (Oct. 1977).
Mitomi, O. et al., "Design of a Single-Mode Tapered Waveguide for Low-Loss Chip-to-Fiber Coupling", IEEE Journal of Quantum Electronics, 30(8): 1787-1793 (Aug. 1994).
Mu, X. et al., "Edge Couplers in Silicon Photonic Integrated Circuits: A Review", Appl. Sci, 10: 2-29 (2020).
Munoz, P. et al., "Silicon Nitride Photonic Integration Platforms for Visible, Near-Infrared and Mid-Infrared Applications", Sensors, 17: 1-25 (2017).
Presby, H., "Near 100% Efficient Fiber Microlenses", OSA/OFC, 404-407 (1992).
Rahim, A. et al., "Expanding the Silicon Photonics Portfolio With Silicon Nitride Photonic Integrated Circuits", Journal of Lightwave Technology, 35(4): 639-649 (Feb. 2017).
Smit, M. et al., "An Introduction to InP-based generic integration technology", Semiconductor Science and Technology, 29: 1-41 (2014).
Smit, M. et al., "Past, present, and future of InP-based photonic integration", APL Photon, 4: 050901-1-050901-10 (2019).
Son, G. et al., "High-efficiency broadband light coupling between optical fibers and photonic integrated circuits", Nanophotonics, 7(12): 1845-1864 (2018).
Vanmol, K. et al., "Two-photon direct laser writing of beam expansion tapers on single-mode optical fibers", Optics and Laser Technology, 112: 292-298 (2019).
Yin, P. et al., "Low connector-to-connector loss through silicon photonic chips using ultra-low loss splicing of SMF-28 to high numerical aperture fibers", Optics Express, 27(17): (Aug. 1-6, 2019).
Zukauskas, A. et al., "Tuning the refractive index in 3D direct laser writing lithography: towards GRIN microoptics", Laser Photonics Rev, 9(6): 706-712 (2015).
Series G: Transmission Systems and Media, Digital Systems and Networks, Transmission media and optical systems characteristics—Optical fibre cables, Characteristics of a single-mode optical fibre and cable, ITU-Telecommunication Standardization Sector of ITU, G.652, (Nov. 1-28, 2016).
Vanmol Koen et al.: "3D direct laser writing of microstructured optical fiber tapers on single-mode fibers for mode-field conversion", Optics Express, vol. 28, No. 24, Nov. 13, 2020 (Nov. 13, 2020), p. 36147, XP093009677, DOI: 10.1364/OE.409148 Retrieved from the Internet: URL:https://opg.optica.org/DirectPDFAccess /AD4E4350-B874-4788-81CC3430F57A85D4_44263 7/OE-28-24-36147.pdf?da=l&id=442637&seq=0& mobile=no>.
Liu Ying et al.: "Three-dimensional printing and deformation behavior of low-density target structures by two-photon polymerization", Proceedings of SPIE; [Proceedings of SPIE ISSN 0277-786X vol. 10524], SPIE, US, vol. 10354, Aug. 31, 2017 (Aug. 31, 2017), pp. 103541U-103541U, XP060092911, DOI: 10.1117/12.2274193 ISBN: 978-1-5106-1533-5.
European Search Report for Application No. 21774893.8 mailed Mar. 22, 2024, 8pgs.

* cited by examiner

Normalized Electric Field Intensity

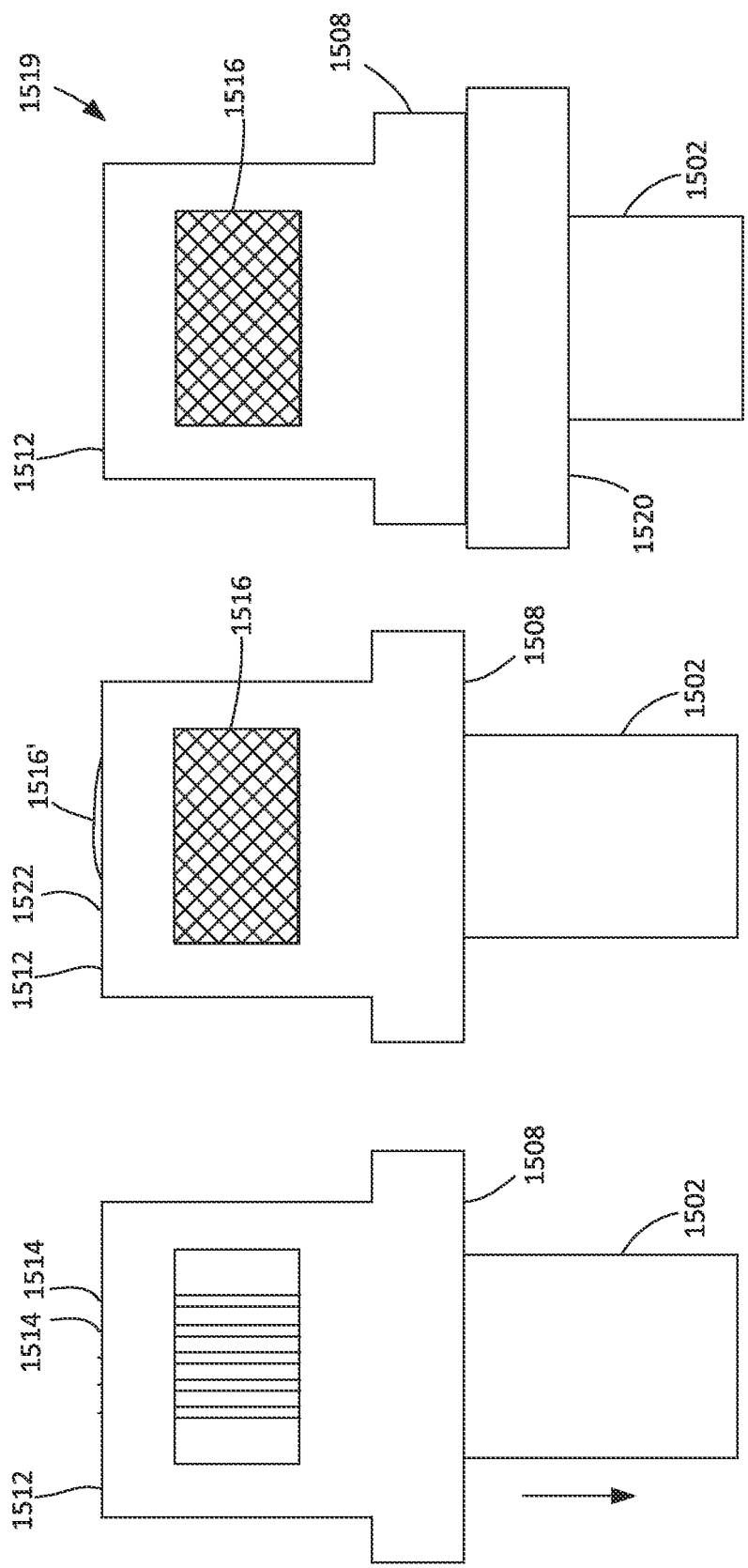

MULTIPLE FIBER CONNECTIVITY BASED ON 2-PHOTON, 3D PRINTED, TAPERED FIBER TIPS

CROSS-REFERENCE TO RELATED APPLICATIONS

This application is a National Stage Application of PCT/US2021/023744, filed on Mar. 23, 2021, which claims the benefit of U.S. Patent Application Ser. No. 62/993,449, filed on Mar. 23, 2020, and claims the benefit of U.S. Patent Application Ser. No. 63/046,479, filed on Jun. 30, 2020, the disclosures of which are incorporated herein by reference in their entireties. To the extent appropriate, a claim of priority is made to each of the above disclosed applications.

FIELD OF THE INVENTION

The invention relates to fiber optical communications, and more particularly to tips that are 3D printed onto the end of a fiber to enhance the coupling of light into and out of the fiber.

BACKGROUND

Connections between standard single-mode fibers and photonic integrated circuits tend to have relatively high coupling losses due to a difference in mode size and profile between both waveguides. Edge coupling strategies involving specialty fibers are frequently used to obtain the best performance in terms of coupling efficiency, bandwidth and polarization independence.

The integration of many different optical components and functionalities into a compact device or chip has been actively investigated for many years. Research into these so-called Photonic Integrated Circuits (PIC) has led to three main material platforms, namely silicon (Si), silicon nitride (SiN) and indium phosphide (InP). All of these platforms have their intrinsic merits and challenges, and are found to be particularly useful for specific components and applications. The Si-platform can make use of high-yield optimized processing techniques compatible with the complementary metal-oxide-semiconductor (CMOS) manufacturing industry for the fabrication of high-volume and small-footprint chips, whereas SiN is showing better performance for passive components in terms of propagation loss and transparency at visible wavelengths, at the expense of a larger footprint. Finally, the InP-platform allows monolithic integration of active components and hence is the platform-of-choice for optical amplifiers and lasers.

While the many developments in chip-level components bring various fascinating opportunities and applications, one of the limiting factors in the widespread adoption of PICs is their packaging, and in particular their connection to the outside world. As the optical modes in integrated waveguides tend to be significantly smaller than those in standard single-mode fibers, creating a highly efficient, robust and alignment-tolerant fiber-to-chip interface remains a challenge.

The two main coupling strategies that have been conventionally investigated are grating couplers and edge couplers. Grating couplers are not as efficient as edge couplers, and their efficiency is dependent on the wavelength and polarization of the light, which can be restrictive when the PIC is intended to operate over a range of wavelengths and/or polarization is not controlled. The edge-coupling approach, also referred to as "in-plane coupling," generally offers the best optical performance in terms of coupling efficiency, spectral transmission bandwidth and polarization independence. This approach often relies on an intermediate coupling scheme that transforms and matches the modal field of the chip waveguide to that of the single mode fiber. Various approaches to achieving this in the past include the implementation of on-chip taper features, specialty fibers, or a combination of both.

The most frequently used types of specialty fibers for fiber-to-chip coupling are lensed fibers. These end-shaped fibertips (usually conical) can be micro-polished or laser-ablated out of standard optical fibers to produce a focal spot down to about >1 μm (full width at half maximum). This free-space approach of coupling is subject to Fresnel reflections at the optical interfaces of the glass fiber and the semiconductor chip. Anti-reflection coatings can improve the coupling efficiency, but they also introduce a wavelength dependence, negatively affecting one of the important advantages that the edge coupling approach has over grating coupling. Secondly, the lensed approach is limited in its design freedom on the shape and size of the focused spot, making it hard to exactly match to the chip's modal fields. Third, the additional step of providing the antireflection coating increases the cost of the PIC product.

As an alternative, research has been done on the use of ultra-high numerical aperture (UHNA) fibers to create a true butt-coupled (physical contact) fiber-to-chip connection. This technique permits the use of an index-matching medium to minimize reflections and is more suitable for mutual alignment of an array of fibers in multifiber edge-coupling structures. On the other hand, these UHNA fibers do not come in a large variety, have little freedom in the desired mode-field diameter (MFD), which is usually between 3 and 5 μm, and require thermal core expansion to achieve efficient coupling to standard single mode fibers. The latter process is cumbersome and its repeatability could still greatly be improved.

There remains a need, therefore, to find improved approaches for coupling between optical fibers, particularly single mode optical fibers, and PICs.

SUMMARY OF THE INVENTION

One embodiment of the invention is directed to a multi-fiber optical device that has a multi-fiber aligning element, a first optical fiber terminating at a first fiber end at the multi-fiber aligning element and at least a second optical fiber terminating at a second fiber end at the multi-fiber aligning element. A first tapered optical element is 3D printed on the first fiber end; and a second tapered optical element is 3D printed on the second fiber end. The first tapered optical element and the second tapered optical element have respective coupling ends flush with an end face of the multi-fiber aligning element.

Another embodiment of the invention is directed to a fiber-coupled optical chip device, that includes a first optical fiber having a first end. A first down-tapered optical element is 3D printed on the first end of the first optical fiber. The first down-tapered optical element has a fiber end proximate the first end of the first optical fiber and a coupling end distal from the fiber end. An optical chip has a first waveguide configured for edge coupling. The coupling end of the first down-tapered optical element is aligned with the first waveguide of the optical chip.

Another embodiment of the invention is directed to a fiber optic device that includes an optical fiber having a first end face and a core. A tapered optical element is 3D printed on the first end face of the optical fiber. The tapered optical element has a fiber end and a coupling end, the fiber end of the tapered optical element being aligned with the core of the optical fiber. The fiber end of the tapered optical element has a first cross-sectional shape and the coupling end of the tapered optical element has a second cross-sectional shape different from the first cross-sectional shape.

Another embodiment of the invention is directed to an optical device that includes an optical fiber having an end face. A tapered optical element is 3D printed on the end face of the optical fiber. The tapered optical element has a fiber end proximate the optical fiber and a coupling end distal to the optical fiber. The tapered optical element has an output face at the coupling end, where the output face is configured to alter divergence of light passing through the output face.

Another embodiment of the invention is directed to an optical device that includes an optical fiber having an end face. An optical element is 3D printed on the end face of the optical fiber, the optical element having a fiber end proximate the optical fiber and a coupling end distal to the optical fiber. An optical axis of the optical fiber passes through the optical element. The optical element has a refractive index gradient in a direction perpendicular to the optical axis.

The above summary of the present invention is not intended to describe each illustrated embodiment or every implementation of the present invention. The figures and the detailed description which follow more particularly exemplify these embodiments.

BRIEF SUMMARY OF THE FIGURES

The invention may be more completely understood in consideration of the following detailed description of various embodiments of the invention in connection with the accompanying drawings, in which:

FIGS. 15A-15F schematically illustrate various steps in manufacturing a multi-fiber holder for fibers terminated using tapered optical elements, using a multi-fiber ferrule according to an embodiment of the invention;

Figure 1:
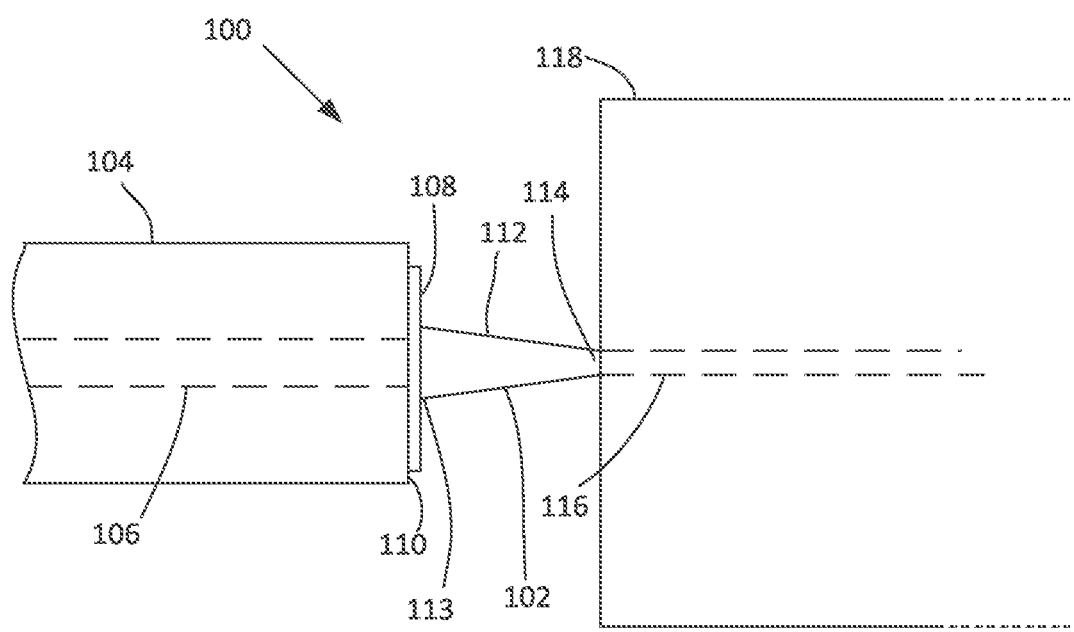
FIG. 1 schematically illustrates a plan view of an optical fiber that is edge-coupled to a photonic integrated circuit (PIC) via an attached down-tapered optical element, according to an embodiment of the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE INVENTION

The approach described herein may be useful for optimizing the fiber side of the fiber-to-chip connection and tailoring the design of the fiber taper to the on-chip waveguide schemes employed in photonic integrated circuit (PIC) devices. The fabrication of free-standing down-taper structures, using two-photon direct laser printing, directly on top of cleaved fiber facets is described. These tapers can find utility for coupling between a fiber and silicon, silicon nitride and indium phosphide PIC chip platforms. The tapered structures may be tailored to provide flexibility in the output modal fields and coupling efficiencies.

An exemplary coupling arrangement 100 is schematically illustrated in FIG. 1, showing a tapered optical element 102 attached to a fiber 104 that has a core 106. The tapered optical element 102 may include a pedestal base 108 that provides a larger surface area for attaching the tapered optical element 102 to the end facet 110 of the fiber 104. The tapered optical element 102 includes a tapered section 112 that aligned to the fiber core 106 and has a first cross-sectional area at the fiber end 113 and a second cross-sectional area at the coupling end 114, which may also be referred to as a coupling tip. The coupling end 114 is aligned to a waveguide 116 of optical chip 118. The second cross-sectional area is typically smaller than the first cross-sectional area when coupling between a single mode fiber and a semiconductor PIC, due to the tighter confinement of the light in the waveguide 116 compared to the fiber core 106. Such a tapered optical element 102 may be referred to as a "down-taper" because the first cross-sectional area at the fiber end 113 is greater than the second cross-sectional area at the coupling end 114. The tapered optical element 102 confines the light passing therethrough and operates as a tapered waveguide that is attached to the end of the fiber core 106.

The tapered optical element 102 may be printed on the end facet 110 of the optical fiber 104 using two-photon polymerization (2PP)-based direct laser writing using a dip-in geometry. This fabrication technology allows the creation of 3D structures with design freedom and submicrometer resolution. A taper structure with excellent modal match in terms of shape and size may be fabricated directly on the end face of the optical fiber such that it can be butt-coupled with the photonic chip to minimize reflections. Furthermore, the design flexibility associated with the 2PP, 3D printed, tapered optical element 102 does not put extra constraints on any on-chip coupling structures. The chip 118 may be coupled to other optical fibers using similar tapered optical elements, for example with the fiber 104 providing an input to the chip 118 and the other fiber or fibers being used for an output or outputs from the chip 118 at a different edge of the chip 118. In other embodiments, for example as discussed below, the fiber 104 may be one of a number of optical fibers aligned to the chip 118 in a multi-fiber alignment device.

The 2PP 3D printing technique has been used in the development of a microstructured antireflective coating, phase masks, lenses, and mode-field expansion up-taper structures on optical fiber tips. In the latter, the fabrication method was demonstrated for use in alignment tolerant physical contact expanded beam fiber-to-fiber connections, as described in K. Vanmol et al., "Two-photo direct laser writing of beam expansion tapers on single-mode optical fibers," Optics and Laser Technology (2019), vo. 112, pp. 292-298, incorporated herein by reference. The 2PP, 3D printing of tapered optical elements on fibers has also been described in International Publication No. WO2019/165205, also incorporated herein by reference.

The present approach may advantageously reduce reflection losses for light passing between the fiber 104 and the chip 118 by, for example, allowing the fiber coupling end 114 to physically contact the edge of the chip 118 at the waveguide 116, or to optically couple to the waveguide 116 via a short path of index matching material. This approach provides a coupling solution for optical chips that does not require re-engineering of the optical chips. Furthermore, connections formed using the tapered optical element can be designed with complete 3D freedom to provide a high degree of matching between the mode-field of the chip 118 and that of the optical fiber 104.

Mode Field Matching

The embodiment of a down-tapered optical element schematically illustrated in FIG. 1, i.e., a tapered element 102 whose cross-sectional area is less at its coupling end than at the base attached to the optical fiber, fabricated on a single mode fiber, includes a 3D printed polymer tapered section 112 that is a core with an air cladding. In such an embodiment, the tapered optical element 102 itself has a large refractive index difference between its core and the air cladding, in which case multiple optical modes may be supported. However, excitation and mode coupling to these higher order modes and radiative modes may be avoided by careful design of the taper structure and proper placement on the fiber facet, such that maximal transmission is obtained in the fundamental mode of the tapered optical element 102. In order to transmit light efficiently between the optical fiber core 106 and the chip waveguide 116, the tapered optical element 102 advantageously has a good overlap between its modal fields and the modal fields of the tapered optical element and chip waveguide.

An eigenmode solver in the MODE simulator of the Lumerical Device Multiphysics Simulation Suite, available from Lumerical Inc., Vancouver, Canada, was used to model the modes of the fiber and the waveguides in various chip platforms. All simulations were performed at a wavelength of 1550 nm, which is one of the main wavelengths used in single mode fiber and PIC technology, due to low material absorption in that spectral range and the many telecom-related applications that come with it.

At the coupling end of the down-taper optical element, the polymer core is advantageously mode-matched to the PIC waveguide mode profile. The modal fields of five different types of PICs, across three different material platforms, were modeled. FIG. 2 gives an overview of the estimated waveguide layouts and their simulated mode profiles.

Two different chips with different input/output waveguide strategies were examined for the silicon platform. The first, shown in FIG. 2A, assumes a silicon oxynitride (SiON) spot-size converter (SSC). The second, shown in FIG. 2B, assumes the use of an inverted Si-taper. Two different chips with different input/output waveguide strategies were examined for the SiN platform. The first, shown in FIG. 2C has a single buried tapered waveguide. The second, shown in FIG. 2D, has a symmetric double-strip geometry. A single chip based on an InP platform is shown in FIG. 2E, having an InGaAsP rib-waveguide. The output mode from a G.652 standard telecom fiber, used as the input in simulations of the down-tapered optical element, is shown in FIG. 2F.

The design was based on the Transverse Electric (TE) polarization state. An analogous methodology may be used to find optimal coupling design for the Transverse Magnetic (TM) polarization states.

An eigenmode analysis and optimization makes it possible to find the optimal taper input and output dimensions for maximal mode overlap with the optical fiber and the optical chips, respectively. The optimal input polymer waveguide diameter at the fiber side is found to be about 15.1 μm, to mode match with the G.652 single mode fiber. At the output side of the tapered optical element, the optimal coupling dimensions depend on the exact PIC waveguide scheme. Such information is often maintained confidential by the manufacturer of the chip.

Figure 2A:
FIGS. 2A-2F present simulated TE modal field intensities of the estimated input/output waveguides of the different material platforms: (A) SiON SSC; (B) inverted Si-taper; (C) inverted SiN-taper; (D) SiN symmetric double-strip; (E) InP waveguide; and (F) G652 standard single mode fiber.
Figure 2A:
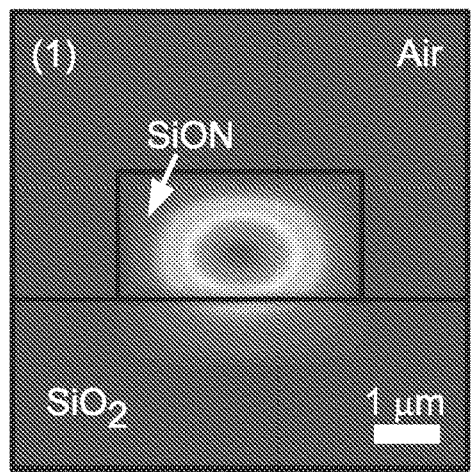
Figure 2B:
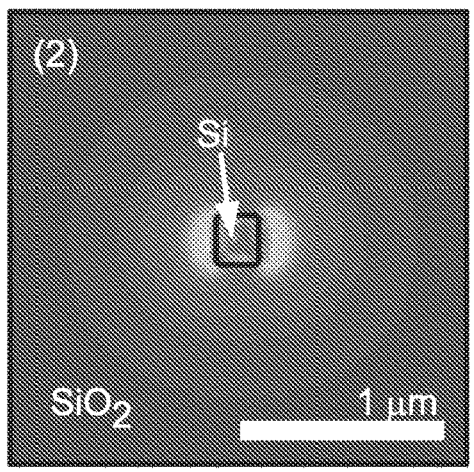
Figure 2C:
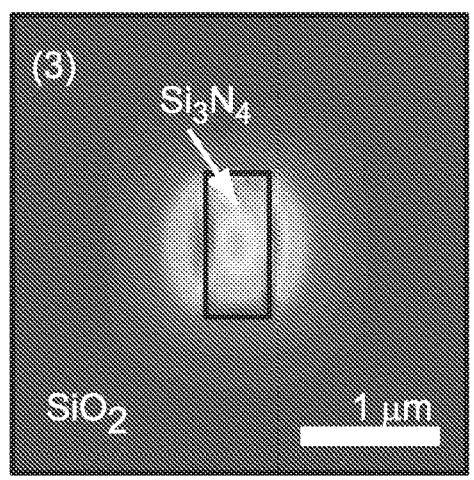
Figure 2D:
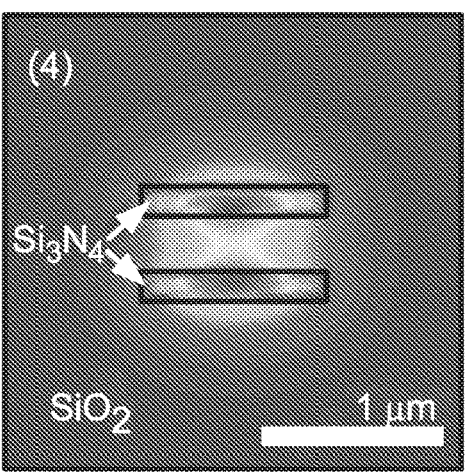
Figure 2E:
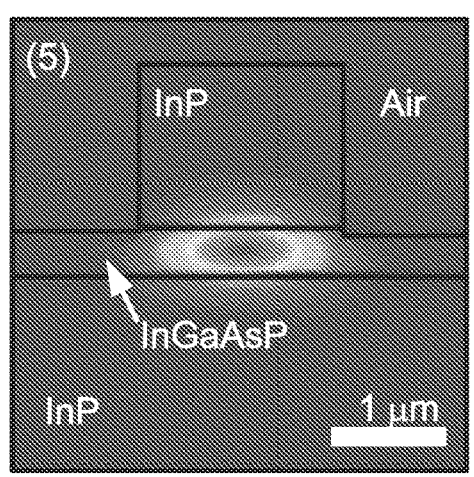
Figure 2F:
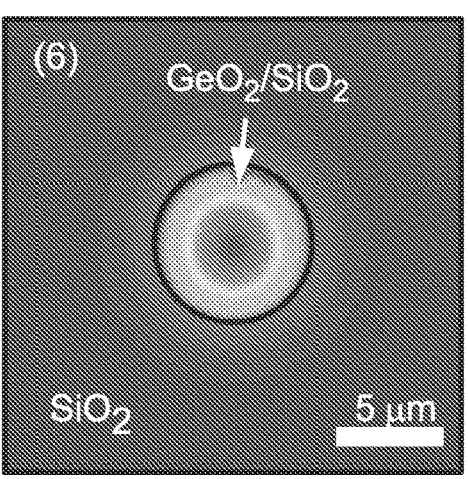
Figure 3A:
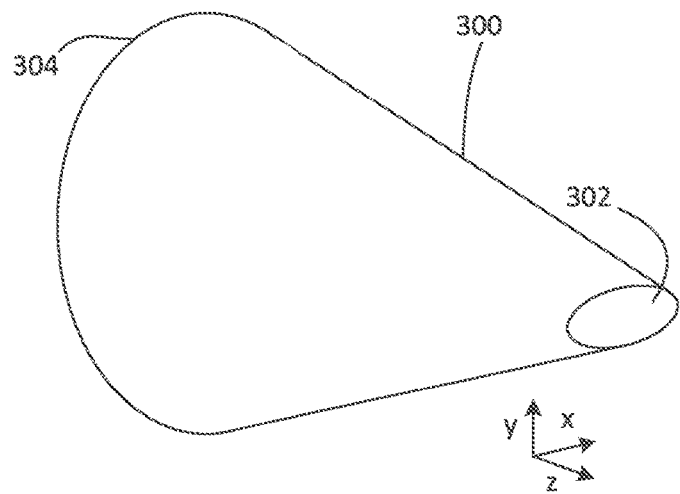
FIGS. 3A-3D schematically illustrate a tapered optical element having a coupling end that has a different cross-sectional shape, in particular an elliptical shape, from the cross-sectional shape of its fiber end, which has a circular shape, according to an embodiment of the invention.
Figure 3B:
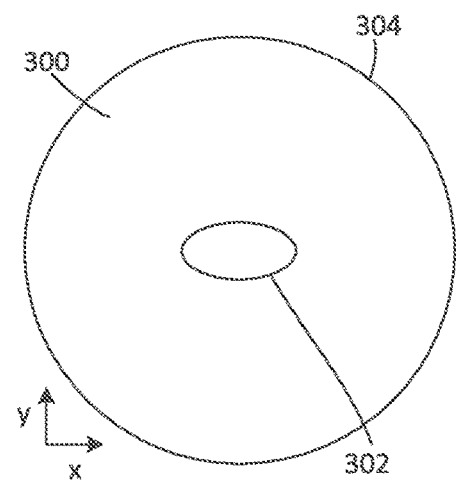
Figure 3C:
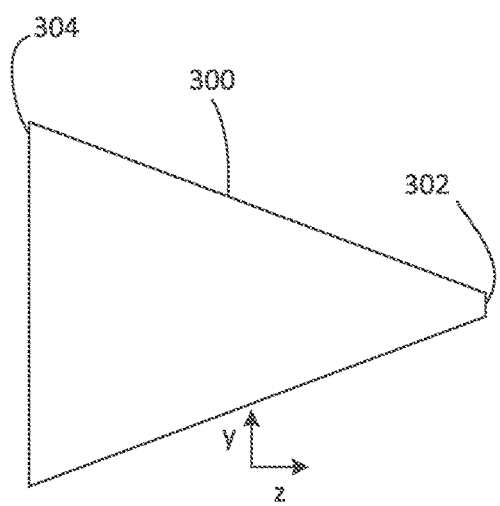
Figure 3D:
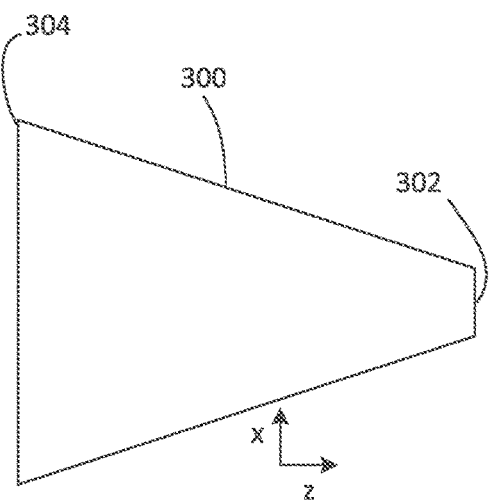

Many waveguide geometries have strong elliptical mode profiles, such as the profiles for the SiON SSC shown in FIG. 2A and the InGaAsP rib waveguide shown in FIG. 2E. A tapered optical element having a coupling end shaped for a mode that closely matches the mode of the chip waveguide increases coupling efficiency between the fiber and the chip waveguide. For example, in the case of a chip waveguide having an elliptical mode, an elliptical or oblong shaped coupling end on the tapered optical element may increase coupling efficiency relative to a circular coupling end. One embodiment of tapered optical element 300, schematically illustrated in FIG. 3A, has a coupling end 302 that has an elliptical shape. The tapered optical element 300 is shown without a pedestal base. In the illustrated embodiment, the fiber end 304 of the tapered optical element 300, opposite the coupling end 302, is that part of the tapered optical element whose optical mode is matched to the optical mode of the fiber to which the tapered optical element is attached. FIG. 3B schematically illustrates an end-on view of the tapered optical element 300 (looking in the −z direction), while FIG. 3C schematically illustrates a side view of the tapered optical element 300 looking along the direction along the major axis of the elliptical coupling end 302 (the x-direction) and FIG. 3D schematically illustrates a side view of the tapered optical element 300 looking along the direction of the minor axis of the elliptical coupling end 302 (the y-direction).

Figure 4A:
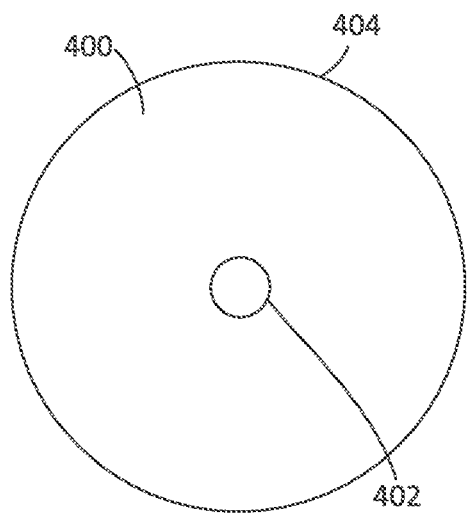
FIGS. 4A-4D schematically illustrate relative cross-sectional shapes of fiber ends and coupling ends of tapered optical elements, according to embodiments of the invention.
Figure 4B:
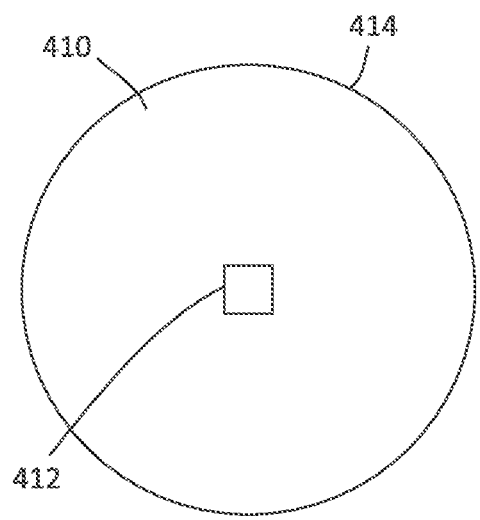
Figure 4C:
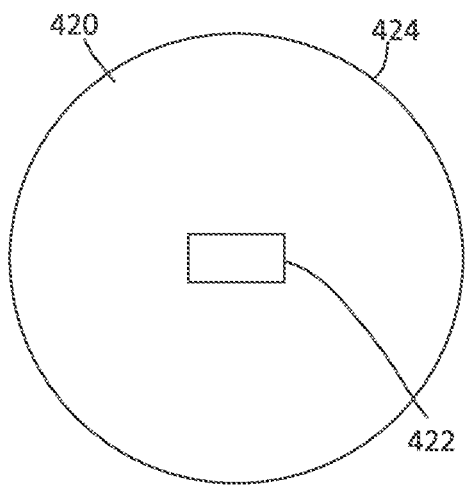
Figure 4D:
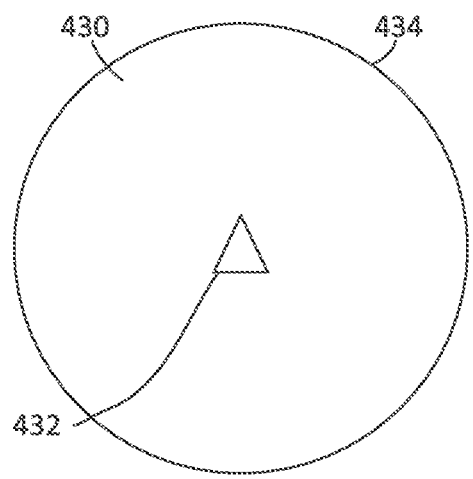

The 2PP 3D laser printing process used to manufacture the tapered optical element conveniently allows a wide variety of shapes to be used at the coupling end of the tapered optical element, some of which are schematically illustrated in FIGS. 4A-4D, which show end-on views of the tapered optical element. In FIG. 4A, the tapered optical element 400 has a circular coupling end 402 and a circular fiber end 404. In the embodiment schematically illustrated in FIG. 4B, the tapered optical element 410 has a square coupling end 412 and a circular fiber end 414. In the embodiment schematically illustrated in FIG. 4C, the tapered optical element 420 has a rectangular coupling end 422 and circular fiber end 424. In the examples shown in FIGS. 3B, 4A, 4B and 4C, the coupling end of the tapered optical element has a shape that has two orthogonal axes of mirror symmetry. This need not be the case, and a shape with different symmetry, or no symmetry, may be used at the coupling end. An embodiment of such an approach is schematically illustrated in FIG. 4D, where the tapered optical element 430 has a triangular coupling end 432 and a circular fiber end 434. Other shapes of coupling end may be used in order to efficiently match the optical mode of the coupling end of the tapered optical element to the mode of the chip waveguide including, but not limited to, other triangles, regular and irregular quadrilateral shapes, including trapezoids, and shapes with more than four sides.

In the embodiments discussed with reference to FIGS. 3 and 4, the fiber ends of the tapered optical elements were all circular. This is not a necessary condition but, where the fiber has a circular core and, therefore, a concomitant circular optical mode, coupling to the tapered optical element from the fiber is efficient when the mode of the fiber end is also circular. The fiber end of the tapered optical element may also have a cross-sectional shape that is not circular.

Taper Profile

Figure 5:
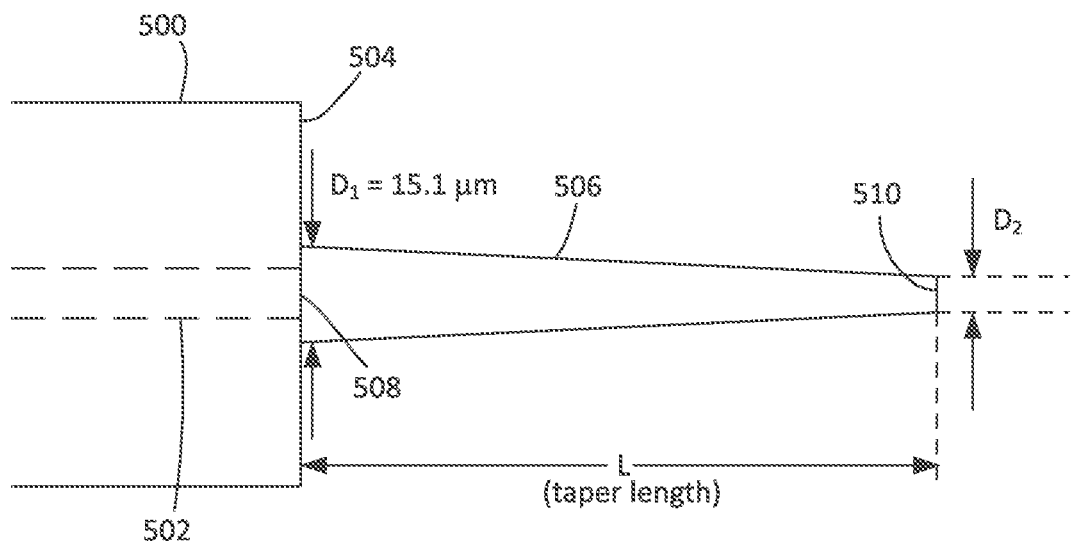
FIG. 5 schematically illustrates an embodiment of a down-tapered optical element showing definitions used in modeling confined optical propagation along tapered optical elements, according to embodiments of the invention.

The Lumerical Mode Solutions software, referenced above, was used to model propagation of light from the fiber through the tapered optical element. A schematic of the model used for these calculations is provided in FIG. 5, which shows a fiber 500 having a core 502 and an output face 504. The tapered optical element 506 is assumed to be circularly symmetrical and has a diameter, $D_1$, at its fiber end 508 of 15.1 μm. The length of the tapered optical element is L and the diameter of the coupling end 510 is $D_2$. The values of $D_2$ ranged from 1 μm to 7 μm in 1 μm increments.

A sweep of the taper length permits a (local) maximum in transmission for the fundamental mode to be found. In general, a larger taper length, which corresponds to a more gradual change in cross section, provides better transmission of the fundamental mode, although this is not always the case. It was found that a taper length of 250 μm is quite adiabatic, giving more than 90% fundamental mode transmission for all output diameters. This taper length limit was chosen to prevent the need for stitching of writing fields in the fabrication process.

While linear tapers provide adiabatic operation, it was found that shorter taper lengths could be achieved using nonlinear tapers. The use of a shorter tapered element reduces the chance that it suffers from mechanical damage, which increases propagation loss. Such nonlinear-shaped tapered optical elements can decrease the total taper length, while keeping the radiation loss from mode-field conversion low. To investigate the usefulness of a nonlinear taper in a tapered optical element, the simulations included a nonlinear function for the diameter of the tapered optical element as a function of distance along the elements, D(z), as follows:

$$D(z)=D_2+(D_1-D_2)\cdot(1-z/L)^m \quad (1)$$

where L is the length of the taper, m is the nonlinear exponent, and $D_1$ and $D_2$ are the taper's input and output diameters respectively.

Figure 6:
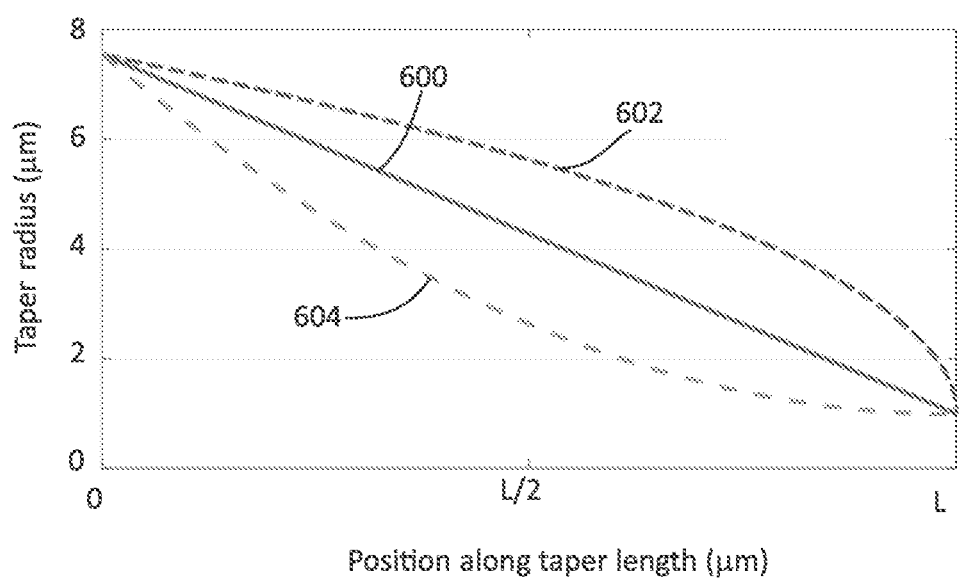
FIG. 6 graphically presents three different taper profiles employed in the modeling of confined optical propagation along tapered optical elements according to embodiments of the invention.

The profile of different tapers is shown in FIG. 6, which shows the taper radius (=D(z)/2) as a function of position along the tapered optical element. The input radius at position zero mode-matched with a single mode fiber (diameter 15.1 μm, radius 7.505 μm) and an output diameter of 2 μm (radius 1 μm). Curve 600 corresponds to a linear taper profile, with the nonlinear exponent, m=1. Curve 602 corresponds to a nonlinear taper profile, with m=1/2. This type of nonlinear taper profile 602, where the radius is greater than the corresponding linear taper profile 600 (with both tapers starting at L=0 and terminating at L=L), is referred to herein as a thick nonlinear taper. Curve 604 corresponds to a nonlinear taper profile, with m=2. This type of nonlinear taper profile 604, where the radius is less than the corresponding linear taper profile 600, is referred to herein as a thin nonlinear taper.

Figure 7:
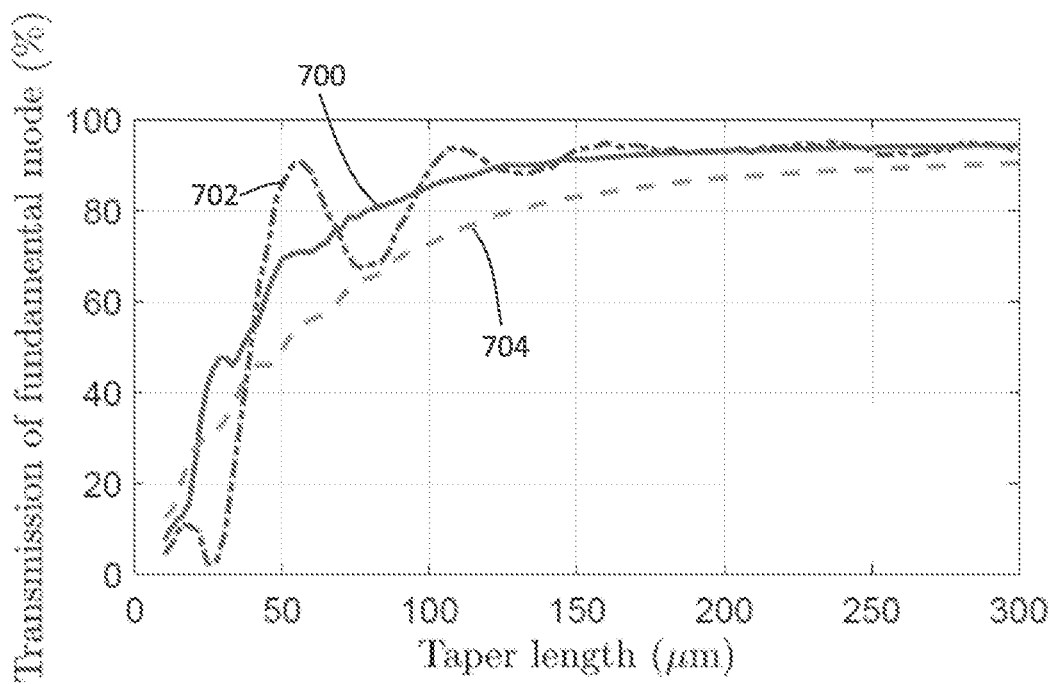
FIG. 7 presents a graph of results of modeling confined optical propagation along tapered optical elements having different taper profiles according to embodiments of the invention, as a function of taper length: curve 700 is for a linear taper, curve 702 is for a thick nonlinear taper and curve 704 is for a thin nonlinear taper.

The calculation of the evolution of the fundamental mode's transmission as a function of taper length for each of these three taper profiles is illustrated in FIG. 7. Curve 700 corresponds to the taper profile having a value of m=1 (linear). Curve 702 corresponds to the taper profile having a value of m=1/2 (thick nonlinear). Curve 704 corresponds to the taper profile having a value of m=2 (thin nonlinear). The profile corresponding to an exponent of m=2 gives less efficient transmission than the other profiles. On the other hand, the thin nonlinear profile, having m=1/2, reaches a point of 89% transmission at a length of 62.7 μm, whereas the linear profile only reaches such a high transmission for lengths larger than 127 μm. Therefore, a nonlinear taper profile structure may allow the use of shorter taper lengths, with a resultant reduction in exposure to damage, with only a small decrease in efficiency compared to longer taper lengths.

Material absorption was not taken into account in the transmission simulations. Cured IP-DIP polymer has an absorption loss of less than 1 dB/cm at 1550 nm. As the length of the tapered optical elements is typically less than one half of one millimeter, material absorption may be sufficiently small as to be neglected.

Reflective Losses

Reflection of the incoming light at an interface of different refractive index media can impair the coupling efficiency. Even when two waveguides are perfectly butt-coupled, without having any air-gap between them, a mismatch between the effective indices of both waveguides may generate back-reflections. The reflectance, R, for a normally incident light beam passing an interface from medium 1 to medium 2 is given by:

$$R=(n_2-n_1)^2/(n_2+n_1)^2 \qquad (2)$$

where $n_1$ and $n_2$ respectively represent the refractive or effective indices of the two media or waveguides.

An optimal mode overlap is targeted for every chip platform, and the difference in effective indices between the tapered fiber and the chip is relatively small, leading to an estimated reflectance of <3% per facet in the Si- and SiN-based platforms. In the InP platform, however, which has a relatively high refractive index, the Fresnel reflection is about 15% per facet.

Misalignment Tolerances

In the investigation of coupling between (sub)micrometer-scale structures, a misalignment tolerance analysis gives many insights into the realistically achievable efficiency of the designed structure in practice. A good understanding of alignment tolerances aids in making decisions in the design phase, in analyzing experimental results, and in defining packaging strategies.

In a butt-coupled (physical contact) connection, lateral misalignments have a higher impact on loss than axial and angular misalignments. The consequences from misalignments are found to be larger with decreasing mode-field diameters. Simulations show that a submicrometer accurate alignment is needed for all chip platforms (Si, SiN and InP) in order to achieve <1 dB misalignment losses. In general, a larger misalignment tolerance may be achieved by making use of wider taper tips, but this may result in lower coupling efficiency.

It may be possible to introduce a small misalignment between the tapered optical element and the fiber core during the taper fabrication process. Nevertheless, the use of high-magnification real-time imaging of the fiber end-facet during the printing process can result in the achievement of submicrometer positioning control.

Impact of Adding Cladding Material

This disclosure has, so far, only considered an air-clad tapered optical element. However, index matching materials play an important role in photonic chip packaging. Such materials usually come in the form of gels or UV-curable epoxies and may be used to fill the air-gap between the chip and the tapered optical element. Judicious selection of the material may result in reducing unwanted reflections at the optical interfaces, thus reducing transmission losses.

The index matching material may, at the same time as providing index matching, be used as an effective cladding for the down-tapered waveguide, and provide mechanical support to the tapered optical element. The cladding may also prevent contamination of the taper interface that could lead to undesired radiation losses and may possibly also decrease possible scattering due to roughness at the taper's side wall.

Figure 8:
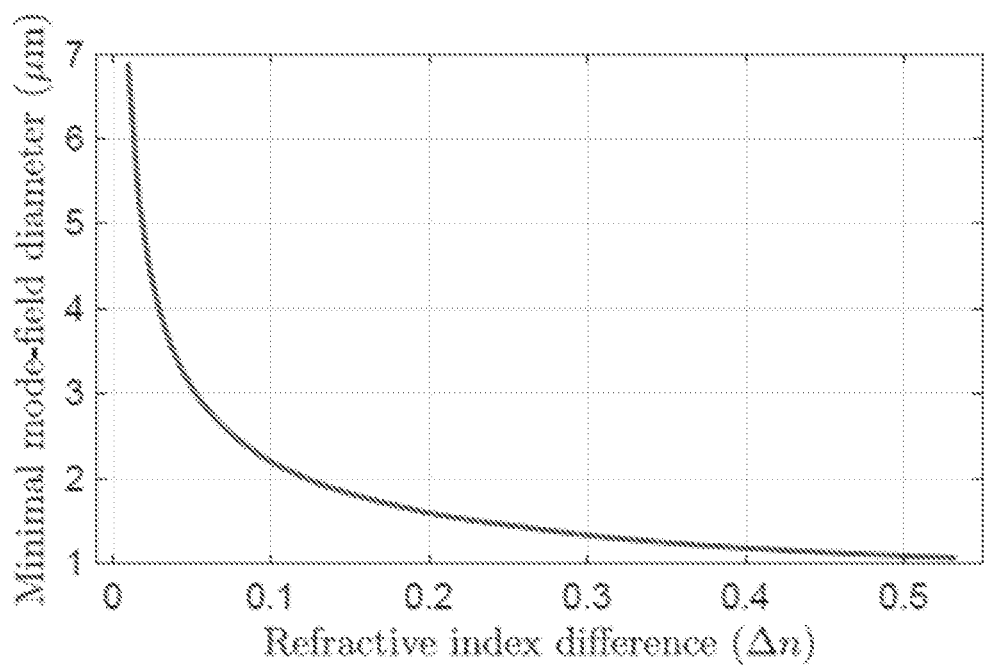
FIG. 8 presents a graph showing minimal mode-field diameter (MFD) as a function of refractive index difference between a tapered optical element and a cladding, according to embodiments of the invention.

A decrease in refractive index difference between the tapered optical element, which is its own waveguide, and the cladding (Δn) reduces the degree of light confinement in the tapered optical element, therefore increasing the size of its mode-field. As such, the minimal mode-field diameter that is possible to obtain increases with decreasing index contrast, as can be seen in FIG. 8. As a result, the choice of cladding material (which determines the index contrast) may include a compromise between fiber-to-taper and taper-to-chip coupling efficiency, and Fresnel reflections.

Methods of Fabrication

A Photonic Professional GT+ system from Nanoscribe GmbH, Eggenstein-Leopoldshafen, Germany, was used in the dip-in configuration to fabricate various tapered optical elements directly on the end-facet of cleaved G.652 single mode fibers.

The fiber core position is identified by sending red laser light through the fiber and then aligned with the printer axes. The full tapered optical element may be printed in a matter of minutes using the built-in galvo scanner. The processing steps may be carried out without any specific environmental restrictions, e.g. temperature or humidity control, other than processing the undeveloped material in a room with UV-filtered lighting conditions to prevent undesired single-photon polymerization of the resist.

Figure 9:
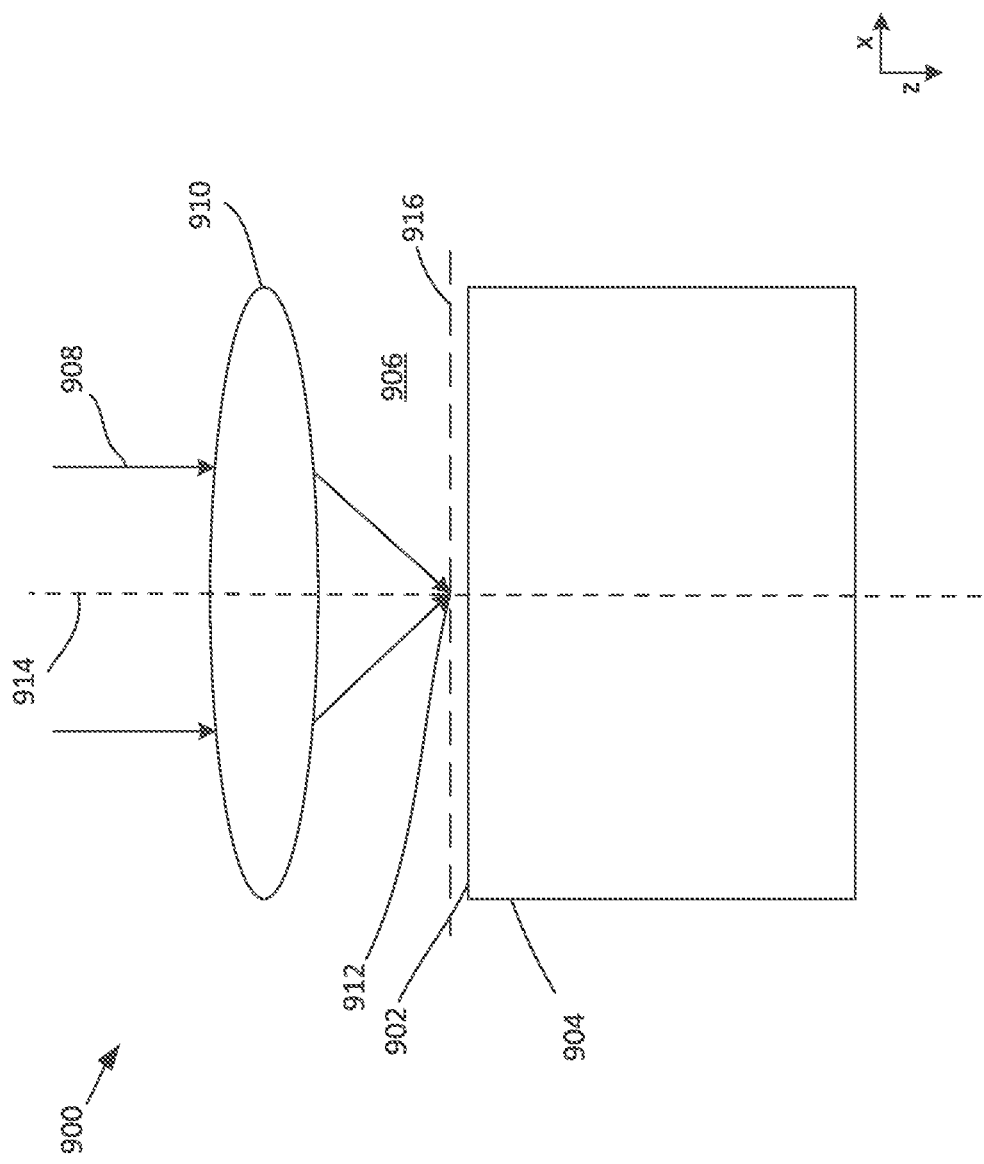
FIG. 9 schematically illustrates an embodiment of an approach to manufacturing tapered optical elements using 2-photon polymerization, 3D printing, and dip-in laser lithography, according to embodiments of the invention.
Figure 10A:
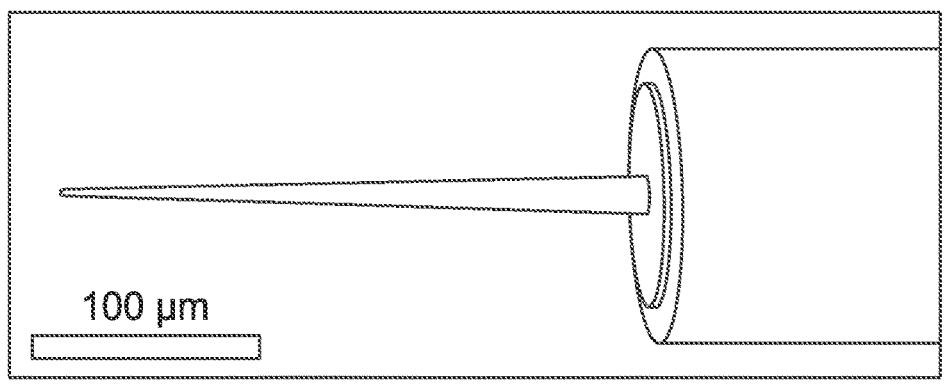
FIGS. 10A-10D present scanning electron microscope (SEM) images of various embodiments of tapered optical elements according to the present invention.
Figure 10B:
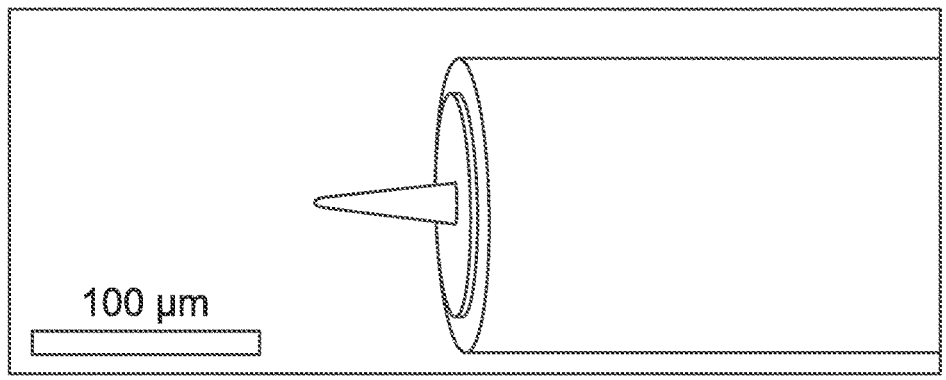
Figure 10C:
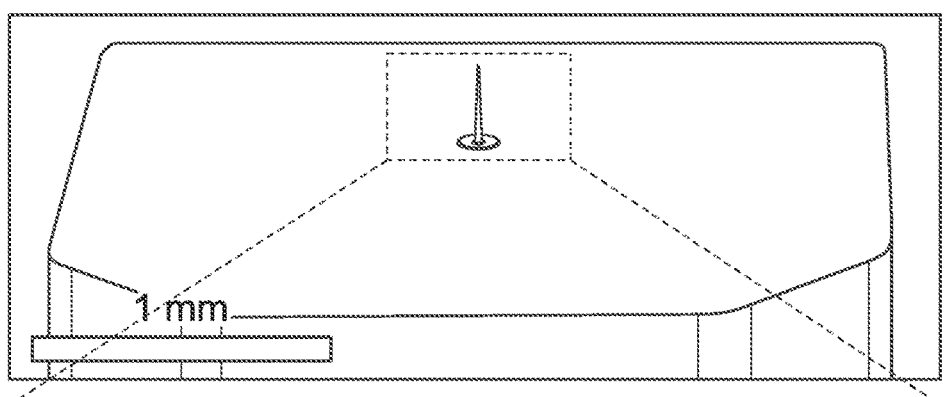
Figure 10D:
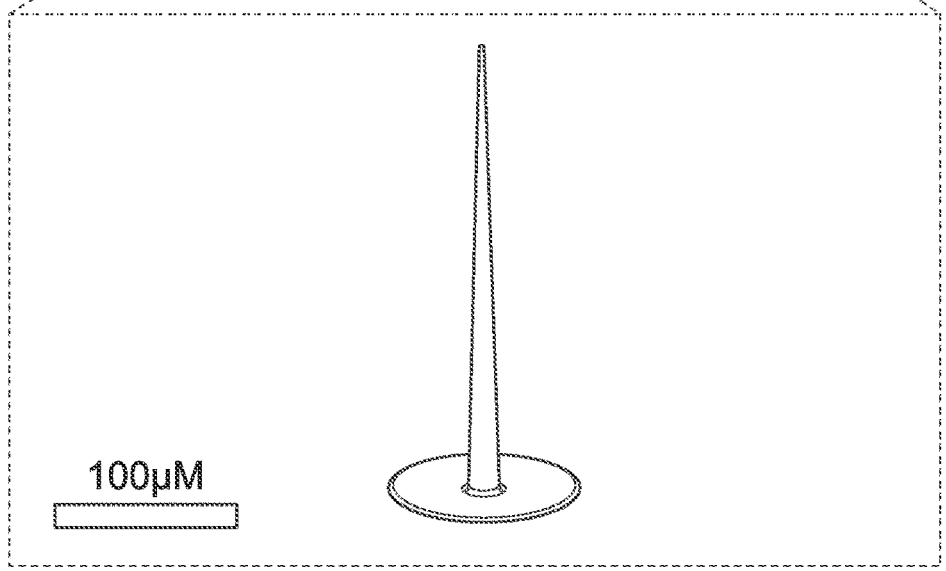

A typical set up 900 for dip-in laser lithography (DiLL), two photon polymerization, 3D printing process is schematically illustrated in FIG. 9, in which a polished end facet 902 of a fiber 904 is immersed in a photosensitive liquid resist 906. Light 908 from a pulsed laser, such as a femtosecond erbium-doped fiber laser, operating at around 1550 nm, or a modelocked Ti:Al2O3 laser operating around 800 nm, is focused by a focusing unit 910, through the liquid resist 906 to a focal point 912. The focusing unit 910 may include one or focusing elements such as lenses or mirrors. In most cases, the volume between the focusing unit 910 and the fiber end facet 902 is filled with the liquid resist 906. In the illustrated embodiment, the focal point 912 is at the intersection of the lens axis 914 and the focal plane 916.

The liquid resist 906 undergoes a multi-photon polymerization reaction at the focal point 912, in most cases a 2-photon reaction, and solidifies. The correct selection of the optical power of the light 908 and the focusing properties of the focusing unit 910 can, therefore, result in the volume element (voxel) where the liquid resist 906 reacts with the light 908 being extremely small, and may be submicron in size. The tapered optical elements discussed below were fabricated using a voxel of around 150 nm×150 nm×500 nm, obtained using a 63×objective with a numerical aperture (NA) of 1.4. The fiber end facet 902 and/or the focal point 912, can be moved in the x-y plane (the y-direction lies out of the plane of the figure) which, together with selective switching of the light 908, results in writing a layer of solidified resist having a desired 2D pattern. The end facet 902 can then be moved in the z-direction by an amount equal to about that of the thickness of the 2D pattern just printed, and another 2D layer can then be printed on top of the previous layer. In this manner, a 3D object can be formed by sequentially printing a number of 2D layers. An advantage of DiLL, in which the liquid resist 906 is polymerized at a point between the fiber 904 and the focusing unit 910 is that the height (z-direction) of the resulting 3D structure is not limited by the focal length of the focusing unit 910.

A system suitable for use in DiLL is the Photonic Professional GT 3D laser lithography system available from Nanoscribe GmbH, Eggenstein-Leopoldshafen, Germany. DiLL is further described in U.S. Pat. No. 9,302,430, incorporated herein by reference. The resist used to fabricate the tapered optical elements is IP-DIP, obtainable from Nanoscribe GmbH. The writing speed and power were according to the manufacturer's specifications.

Good adhesion of the polymer tapered optical element to the fused silica ($SiO_2$) end-facet 902 is an important consideration. For this reason, in some embodiments, a pedestal base layer is first formed on the end facet 902 prior to forming the tapered body, where the base plate has a larger area in contact with the end facet 902 than would the fiber end of the tapered body alone. The base plate layer may be any suitable thickness. In some embodiments, a base plate layer having a thickness of about 6 µm is employed. Simulations show that such a thin base layer has negligible impact on the light transmission.

Additionally, an adhesion promotor may be used to enhance the adhesion of the polymerized material to the surface of the fiber's end facet 902. In some embodiments, the adhesion promotor is a silane, for example, 3-(methacryloyloxy)propyltrimethoxysilane ethanol solution (2%, v/v), which may be applied by dipping the fiber end into the silane solution. This chemical surface treatment may enhance the formation of covalent bonds between the organic polymer and the inorganic fiber silica glass upon laser exposure, effectively connecting both materials. In an experiment to test the ability of the silane to promote adhesion to glass, when an increasing shear force was applied to a tapered optical element that was written without a silane-pretreatment on the glass surface, the tapered optical element broke free of the glass at an applied force of 0.015 N. In contrast, when the experiment was performed on a similar tapered optical element that was written on the glass after a silane-pretreatment, the tapered optical element resiliently withstood an applied shear force of 0.15 N.

Figure 11A:
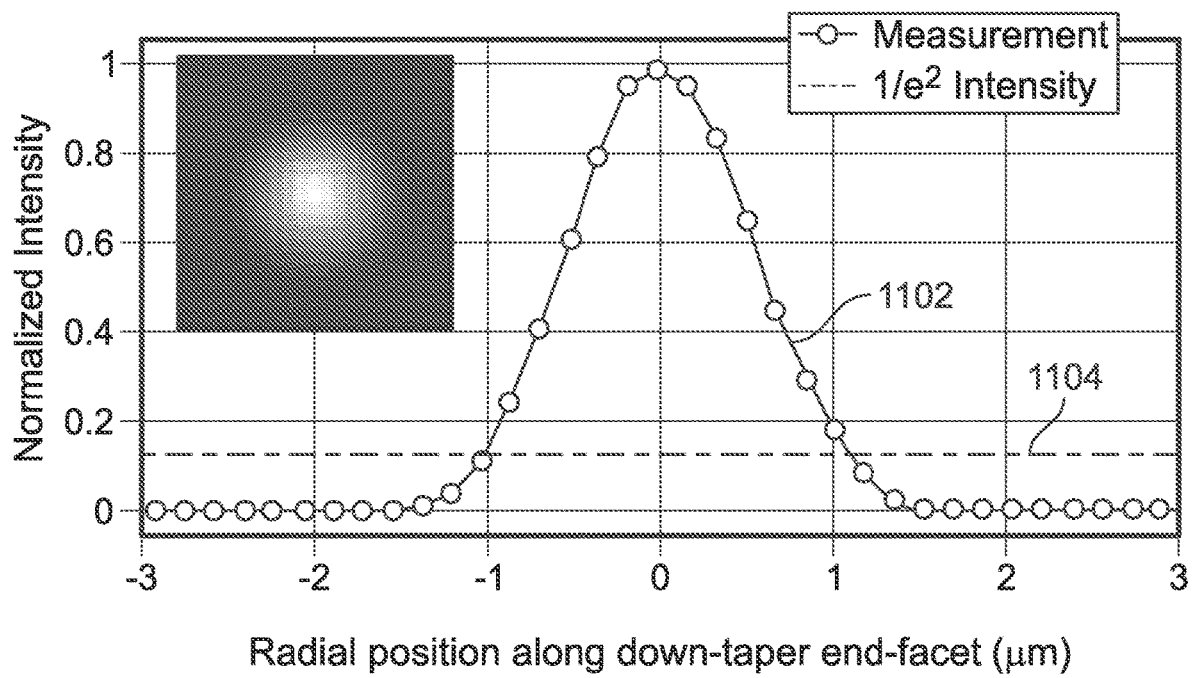
FIGS. 11A and 11B present results of MFD measurements on tapered optical elements according to the invention: (A) presents near field measurements made at the output of a tapered optical element and (B) presents a graph showing measured MFD as a function of coupling tip diameter for a linear tapered optical element and a single MFD measurement for a nonlinearly tapered optical element.
Figure 11B:
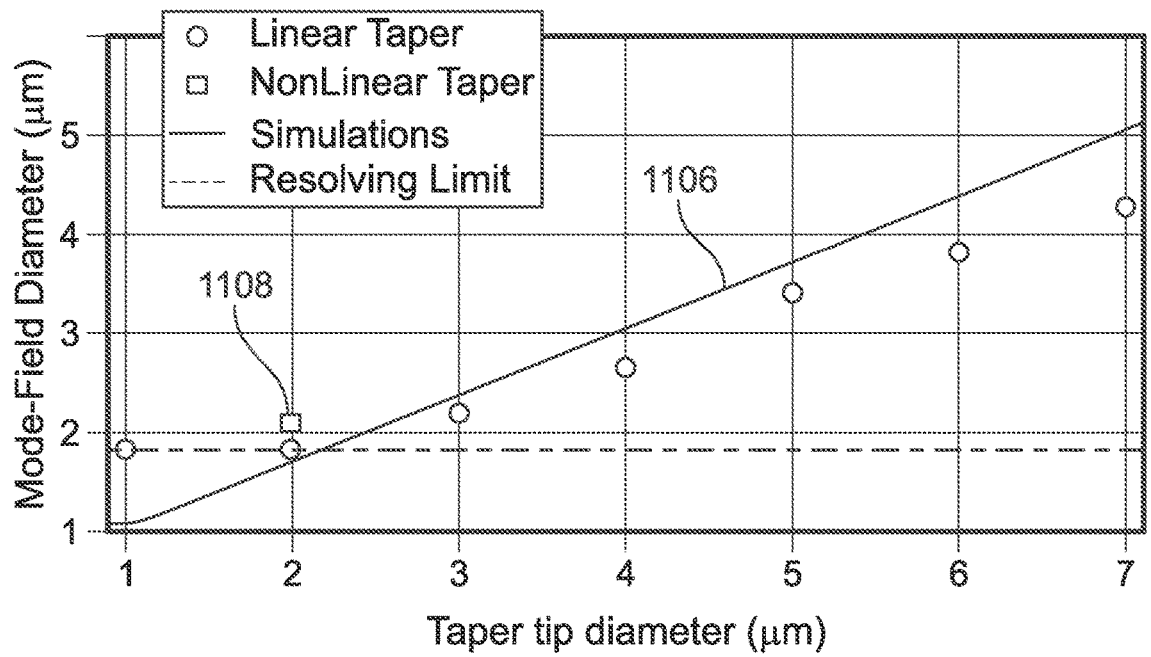

Submicrometer fabrication tolerances are obtained with the 2PP direct laser writing system, which is quantitatively verified using an SNE-4500M scanning electron microscope (SEM) (Hirox Europe, Limonest, France), a Contour GT-I white-light interferometer (Bruker Corp, Billerica, MA, USA), and a VideoCheck UA400 coordinate measurement machine (Werth Messtechnik GmbH, Giessen, Germany), SEM images of the linear and nonlinear down-taper models are shown in FIG. 10. FIG. 10A shows a scanning electron microscope (SEM) image of a linear tapered optical element that is approximately 250 µm long, fabricated on the end of a single mode fiber. The element has a pedestal base that is approximately 6 µm thick, and has a diameter of 100 µm. The diameter of the tapered optical element at its coupling end is 3 µm. FIG. 10B shows an SEM image of a thick nonlinear tapered element that is approximately 63 µm long, fabricated on the end of a single mode fiber. The element has a pedestal base that is approximately 6 µm thick, and has a diameter of 100 µm. The diameter of the thick nonlinearly tapered optical element at its coupling end is 2 µm. FIG. 10C shows an SEM image of a linear tapered optical element fabricated on a glass block. FIG. 10D shows a magnified image of the element of FIG. 10C. The element has a pedestal base that is approximately 6 µm thick, and has a diameter of 100 µm. The diameter of the tapered optical element at its coupling end is 3 µm The output modal fields of the tapered optical elements were characterized using a Bobcat SWIR camera from Xenics nv (Leuven, Belgium), accompanied by a Zeiss 100×NA0.9 microscope objective (Carl Zeiss Microscopy GmbH, Jena, Germany) allowing high-magnification and high-resolution images of the modes at telecom wavelengths. An experimentally obtained mode-field image from the end-facet of a linear tapered optical element having a tip diameter of 3 µm is shown in FIG. 11A. The inset shows the image obtained by the camera. The curve 1102 shows intensity as a function of radial position. The dot-dashed line 1104 is the $1/e^2$ intensity contour, from which it can be seen that the 3 µm coupling tip diameter produces an MFD of just over 2 µm. FIG. 11B shows the measured mode field diameters (MFDs) for different taper designs. The dots show the measured MFDs for linear tapers having output diameters of 1 µm to 7 µm. This near-field measurement technique allows imaging MFDs down to about 1.8 µm, determined by the microscope's resolving power. Thus, the measurement of the MFD of the linear taper having a 1 µm output diameter was resolution limited at 1.8 µm. The sloped line 1106 shows the calculated MFD as a function of output diameter. For all but the smallest tip diameters, the measured MFD was less than the calculated MFD.

The point 1108 shows the measured MFD for the thick nonlinear taper having an output diameter of 2 µm. The MFD of the thick nonlinear taper is only slightly larger than that of its linear counterpart, which may be caused by the change in nonlinear taper diameter being more abrupt close to the coupling end of the element, making it more sensitive to the layered fabrication approach inherent to the 3D printing process.

Coupling Experiments

Coupling experiments were carried out using fibers terminated with a tapered optical element having a linear profile, fibers terminated with a tapered optical element having a nonlinear profile and, for comparison with conventional approaches, commercially obtained lensed fibers. The results reported below for the linearly tapered optical element were obtained using an element of around 250 µm long and coupling tip diameters ranging from 1 µm to 7 µm. The linearly tapered optical element had a base like that shown in FIG. 10A. The commercially obtained lensed fibers were measured to have an MFD of about 2.7 μm. Some experiments were also carried out using a thick nonlinearly coupled element (m=1/2) having a length of around 63 μm, and coupling tip diameter of 2 μm. The nonlinearly tapered optical element had a base like that shown in FIG. 10B.

Figure 12A:
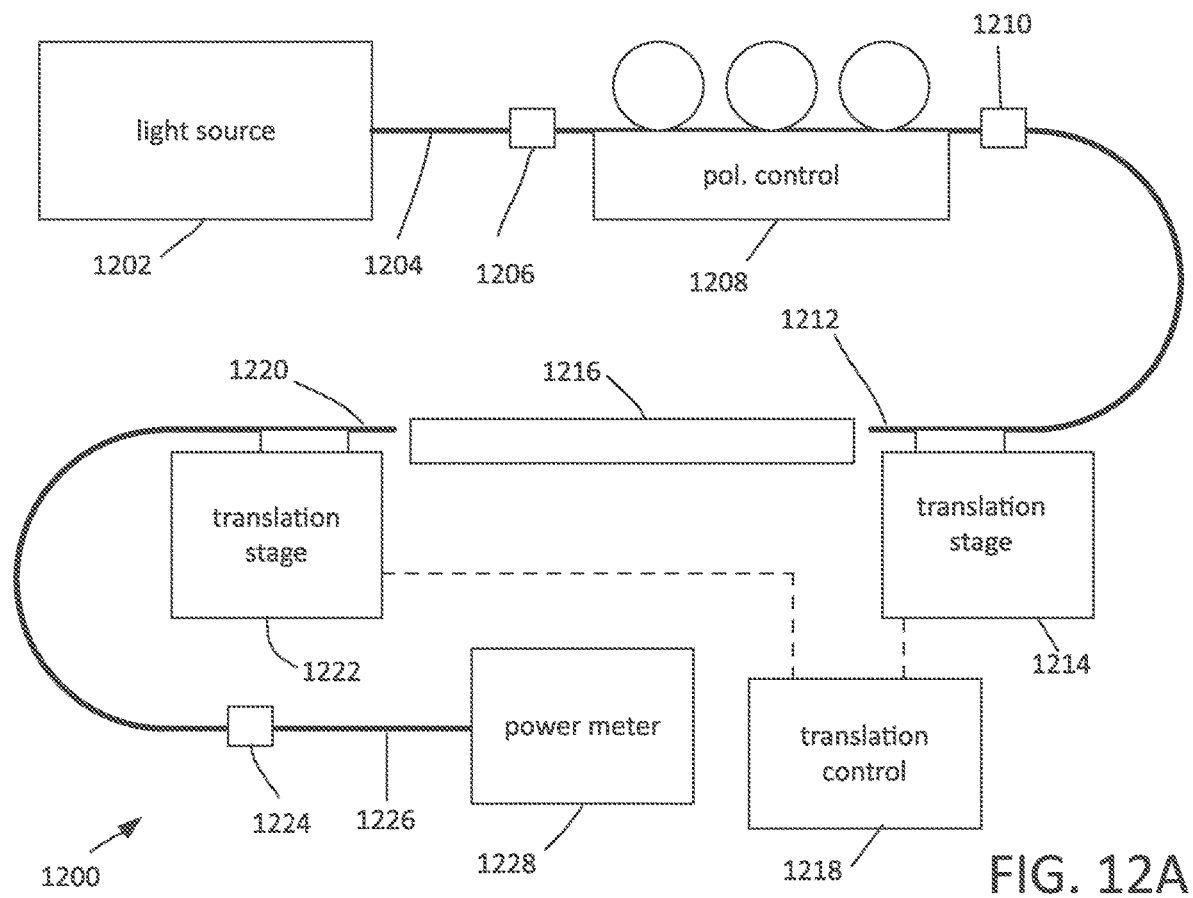
FIG. 12A schematically illustrates an experimental set-up used for measuring coupling losses between a tapered optical element according to the invention and an optical chip.

The experimental set-up 1200 used in the coupling experiments is schematically illustrated in FIG. 12A. A light source 1202 is used to generate light, in this case at around 1550 nm. The light source 1202 included a fiber-coupled tunable WDM8-C-27A-20-NM laser source operating at 1549.36 nm combined with a Pro 8000 controller (both available from Thorlabs, Newton NJ, USA). Light from the light source 1202 propagated along a first fiber 1204 via a first fiber coupler 1206 to a fiber-coupled polarization controller 1208, which was used to align the polarization of the fiber mode to the desired mode of the PIC waveguide under test. The fiber-coupled polarization controller 1208 was coupled, via a second fiber coupler 1210 to a first test fiber 1212, which was terminated using a tapered optical element or a lens. The output end of the fiber 1212 was mounted to a translation stage 1214, for example a piezo translation stage, so that its position could be adjusted relative to the PIC 1216. The translation stage was operated via a translation controller 1218. The translation controller 1218 was used to move the translation stage 1214 so as to align the fiber termination to the waveguide of the PIC 1216. A second test fiber 1220, terminated with a tapered optical element or lens, and mounted on a second translation stage 1222 which was also operated via the translation controller 1218, was aligned with an output waveguide of the PIC 1216. The second fiber 1220 was coupled via a third fiber coupler 1224 and fiber 1226 to a fiber-coupled power meter 1228.

Figure 12B:
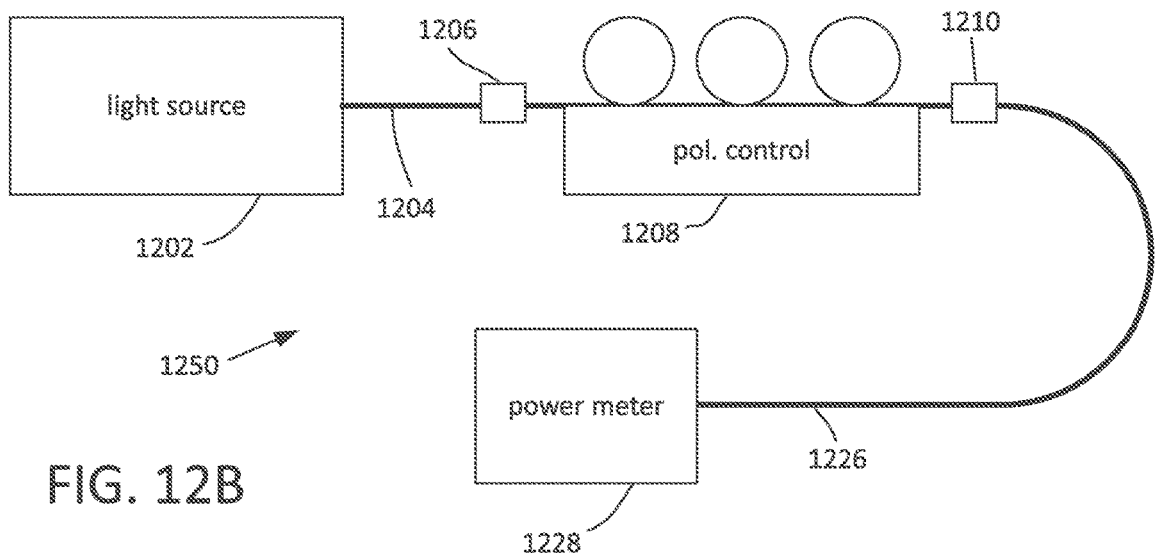
FIG. 12B schematically illustrates an experimental set-up used for calibrating the set-up illustrated in FIG. 12A.

A reference measurement, where the chip and functionalized fibers are removed, was made using the experimental set-up 1250, schematically illustrated in FIG. 12B. The reference measurement produced a baseline power level which was subtracted from the power level obtained using the set-up 1200 in FIG. 12A, together with the known waveguide loss in the PIC 1216 to obtain a value for the coupling loss per chip/fiber interface. A reference measurement taken by the set-up 1250 shown in FIG. 12B takes into account one less fiber connector than the measurement made in FIG. 12A, and will, therefore tend to overestimate the coupling loss. This way, the obtained coupling loss includes Fresnel reflections and the loss due to absorption, mode conversion and mode mismatch from both the on-chip coupling structures and the fiber taper terminations. A comparison with commercial lensed fibers is then easily done by measuring the losses in the same way.

Figure 13:
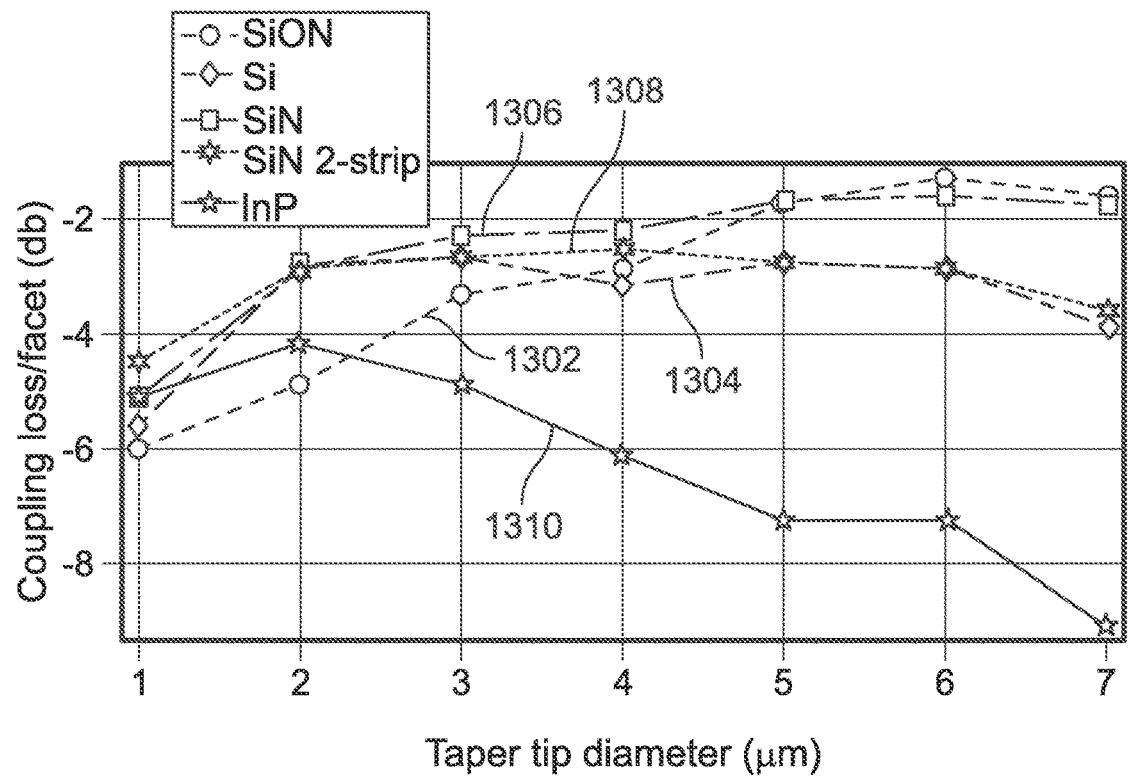
FIG. 13 presents a graph of experimentally obtained values of coupling loss per facet for a linear tapered optical element according to the invention, as a function of coupling tip diameter, for five different semiconductor photonic integrated chip platforms.

FIG. 13 presents the experimentally obtained coupling losses/facet for all five different chip platforms as a function of coupling tip diameter using linear tapered optical elements. Curve 1302 (circles) represents the results obtained for the SiON platform, whose mode calculation is presented in FIG. 2A. Curve 1304 (diamonds) represents the results for the Si platform, whose mode calculation is presented in FIG. 2B. Curve 1306 (squares) represents the results for the SiN platform, whose mode calculation is presented in FIG. 2C. Curve 1308 (6-pointed star) represents the results for the SiN 2-strip chip, whose mode calculation is presented in FIG. 2D. Curve 1310 represents the results for the InP platform, whose mode calculation is presented in FIG. 2E. A minimum coupling loss was found as a function of taper tip diameter for every PIC platform. This illustrates an advantage of this flexible design and fabrication strategy, which permits an optimization for coupling efficiency for any given on-chip structure.

A summary of the minimum coupling losses for each of the PIC platforms is given in Table I below, for the linear tapered optical element and the lensed fiber. For four out of the five PIC platforms the tapered optical element was found to incur lower losses than the lensed fiber. with an improvement in coupling efficiency of respectively 0.97 dB, 0.44 dB, 0.03 dB and 1.43 dB for the SiON, SiN, double-strip SiN, and InP platforms. For the Si-platform, it was found that the linear tapered optical element achieved a slightly lower coupling efficiency (0.59 dB) than for the lensed fiber. It is believed this was due to a small mismatch in mode profile, which is expected to be improved with further development. These observations show that it is beneficial to use an optimized mode-matching design so as to reduce the overall coupling losses in fiber-to-chip connections. An additional advantage of using a tapered optical element over lensed fibers is that a physical contact through butt-coupling can be used, which facilitates a more robust packaging of the PIC. Such approaches are described in more detail below.

TABLE I

Summary of the experimental results for chip coupling loss per facet for lensed fibers, and fibers terminated by a tapered optical element, both linear and nonlinear

| PIC Platform | Lensed (dB) | Linear taper (dB) | Nonlinear taper (dB) |
|---|---|---|---|
| (1) SiON | −2.31 | −1.34 | n/a |
| (2) Si | −2.10 | −2.69 | −2.78 |
| (3) SiN | −2.09 | −1.65 | n/a |
| (4) SiN | −2.58 | −2.55 | n/a |
| (5) InP | −5.61 | −4.18 | −4.27 |

In addition, a thick nonlinear tapered optical element (m=1/2) was fabricated on single mode fibers and the per facet coupling loss determined. As discussed above, the nonlinear taper is advantageous in that it may be shorter than its linear equivalent while still transmitting a similar fraction of the optical signal. The nonlinear tapered optical elements were formed with a coupling tip diameter of about 2 μm and a length of about 63 μm. They were tested with the Si and InP platforms, which had been shown to have a minimum coupling loss for a linear tapered optical element having a coupling tip diameter of around 2 μm. The coupling between the Si-chip and the nonlinear tapered optical element was found to produce a per facet coupling loss of −2.78 dB, and −4.27 dB for the InP chip. These results show that the use of a nonlinear taper profile may allow the length of the tapered optical element to be significantly decreased, with only a small penalty, around 0.1 dB, in terms of coupling efficiency.

Figure 14:
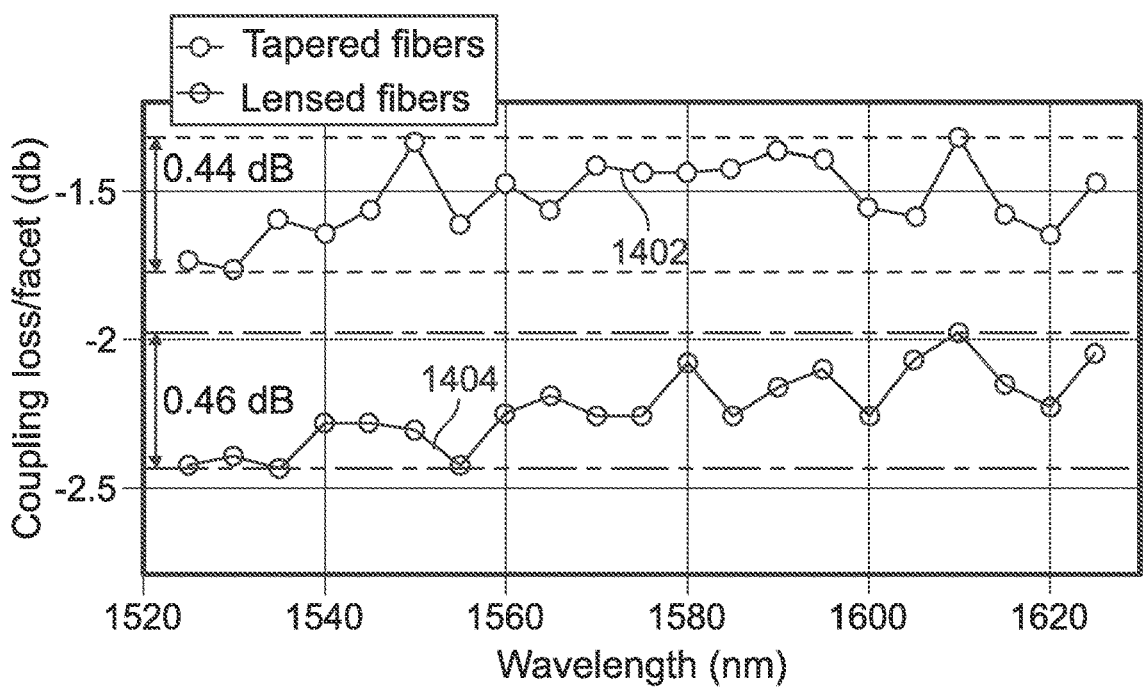
FIG. 14 presents a graph of experimentally obtained values of coupling loss per facet, as a function of wavelength, for coupling via a tapered optical element according to the invention and via a lensed fiber.

A coupling comparison was made over a wide range of wavelengths between fibers using a linear tapered optical element and lensed fibers, around 1525 nm-1630 nm, which encompasses the C and L telecommunication bands. For this experiment, the light source 1202 was a Tunics T100S-HP tunable laser obtained from EXFO Inc., Quebec City, Canada. Facet coupling losses were obtained using the SiON platform. The linear tapered optical element had a coupling tip diameter of 6 μm, which was found to be the optimal size for the SiON platform. The results of the comparison are shown in FIG. 14. Curve 1402 shows the facet coupling loss as a function of wavelength using the tapered optical element, while curve 1404 shows the same thing but for the lensed fibers. The losses incurred using the tapered optical element were uniformly less than those incurred using the lensed fibers over the entire wavelength range. Furthermore, the range in coupling efficiency obtained using the tapered coupling element was about 0.44 dB, compared to 0.46 dB obtained using the lensed fibers. This shows that a coupling scheme based on the use of a tapered optical element may be relatively independent of wavelength over the C and L bands.

As the tapered optical element coupling scheme makes use of a true butt-coupled approach, it is advantageous that no damage occurs to either the chip of the tapered optical elements upon physical contact. It has been found that the polymer tapered optical elements are sufficiently bendable, such that the element would bend upon physical contact with the chip without causing any damage (when using translation stages, under practical and realistic circumstances). Unless excessive force is applied, the taper returns to its original straight shape when it is withdrawn from the chip facet, and no degradation in coupling loss is observed.

Multiple Fiber Connectivity

Tapered optical elements may be used for single fiber connections, for example to a PIC or to another fiber. In fiber-fiber coupling, the tapered optical element may be referred to as an "up-taper" where the cross-sectional area of the element becomes larger for distances further from the base.

There is an increasing need to provide multiple fiber connections in a single device. For example, MPO connectors have become widely used in in fiber-to-fiber connections, and remains a need to provide multiple fiber connections to an optical chip. These connections need to be efficient, i.e. introduce low loss, and be mechanically sturdy to withstand the rigors of deployment in different environments.

Some embodiments of the invention are directed to providing multi-fiber connectivity between a fiber ribbon and another plurality of waveguides by terminating the fibers of the fiber ribbon with tapered optical elements, and housing the fibers in a multi-fiber aligning element. The other plurality of waveguides may comprise, for example, cores of fibers of another ribbon cable, or waveguides in an optical chip. A multi-fiber aligning element is an element that holds multiple optical fibers in a defined, spatial relation. In some embodiments the multi-fiber aligning element may be the ferrule of a multi-fiber coupler, such as an MPO coupler. In other embodiments the multifiber aligning element may be an alignment block provided with alignment grooves. Different embodiments of the invention that provide multi-fiber connectivity are now discussed.

One approach to providing multiple fiber connectivity using fibers mounted in a ferrule, such as an MPO ferrule, and terminated with tapered optical elements is now discussed with reference to FIGS. 15A-15D. FIG. 15A schematically illustrates a fiber cable ribbon 1502. In the illustrated embodiment, the ribbon cable 1502 contains five optical fibers 1504, but the ribbon cable 1502 may contain any number of fibers. The end of the ribbon cable 1502 has been stripped to expose the individual fibers 1504, and the fibers 1504 are cleaved to be the same length, i.e. so that their ends lie in the same plane, indicated by dotted line 1506. In some embodiments, the fibers 1504 may be polished in order to increase the coplanarity of the fiber ends.

Figure 15C:
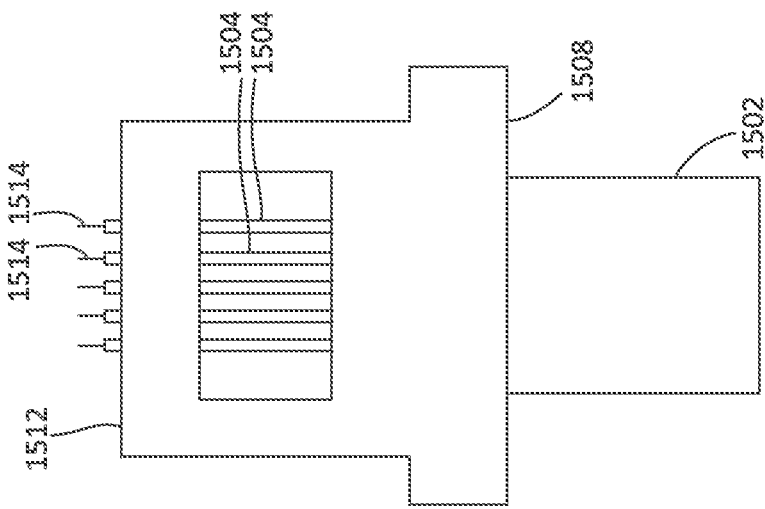
Figure 15B:
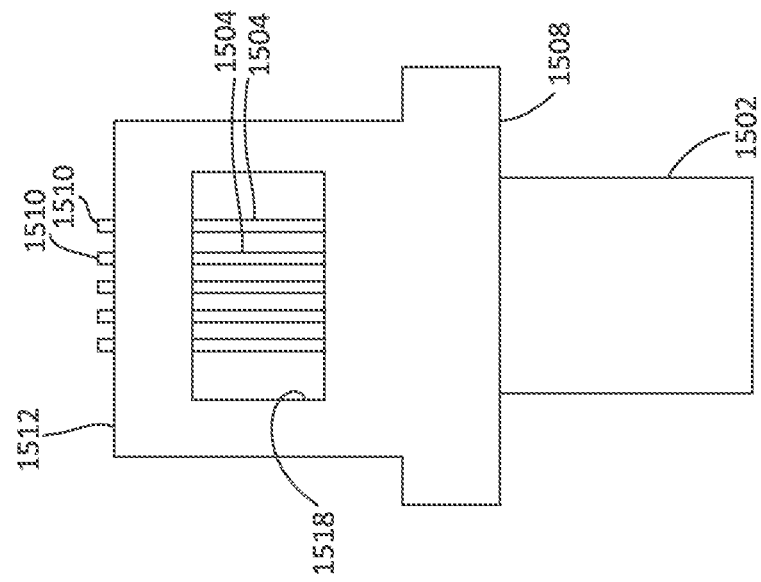
Figure 15A:
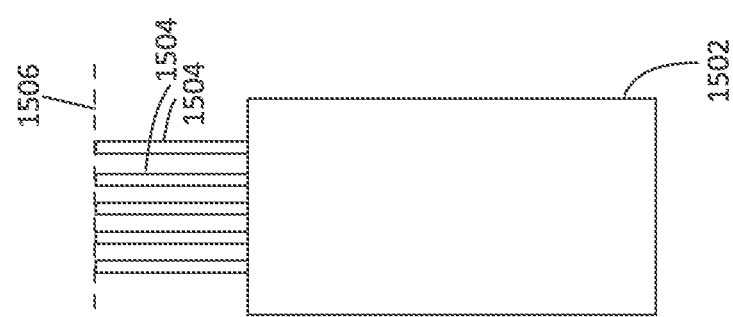

The ribbon cable 1502 is then inserted into a ferrule 1508, for example an MPO ferrule, that is adapted to receive multiple fibers, as is schematically illustrated in FIG. 15B. The ribbon cable 1502 is inserted to a point such that the ends 1510 of the fibers 1504 are slightly protruding from the end surface 1512 of the ferrule 1508, for example by 1 mm or less. A small amount of temporary adhesive, such as an epoxy, may be used to temporarily maintain the position of the ribbon cable 1502 within the ferrule 1508 through the next steps. In some embodiments the temporary adhesive may be injected in the ferrule 1508 through the window 1518 using a micropippete. In another embodiment, the ribbon cable 1502 may be clamped to the ferrule 1508, so that both cannot move relative to teach other.

Tapered optical elements 1514 are then fabricated on the ends 1510 of the fibers 1504, for example in a manner as described above, as schematically illustrated in FIG. 15C. The tapered optical elements may include a down-taper profile, for example if the finished article is going to be used to couple the fiber ribbon cable 1502 to a PIC having waveguides smaller in dimension than the cores of the fibers 1504, or may have an up-taper profile, for example for coupling from one fiber ribbon to another.

Next, as is schematically illustrated in FIG. 15D, after releasing any temporary adhesive or clamp, the ribbon cable 1502 is withdrawn from the ferrule 1508 in the direction shown by the arrow so that the end tips of the tapered optical elements 1514 are protruding from the ferrule 1508. The fibers 1504 may then be glued in place within the ferrule 1508, for example using an adhesive 1516, as schematically illustrated in FIG. 15E. The adhesive 1516 may be, for example, a uv cured epoxy or other suitable adhesive material, such as uv curable ORMOCOMP, available from micro resist technology GmbH, Berlin, Germany. The adhesive 1516 may spread into the volume between the fibers 1504 and between the tapered optical elements 1514, in which case the adhesive 1516 may operate as a cladding for the tapered optical elements 1514.

The end surface 1512 of the ferrule 1508 may then be polished, removing any portion of the tapered optical elements 1514 extending beyond the end surface 1514 of the ferrule 1508, along with any excess adhesive 1516' that extends beyond the end surface 1512. The resulting multi-fiber coupling device 1519, as schematically illustrated in FIG. 15F, comprises a multi-fiber ferrule whose guided outputs have a different MFD from the core of the fibers 1504 that enter the ferrule 1508. The multi-fiber coupling device 1519 may include a fiber clamp 1520 along with the ferrule 1508.

In some embodiments, the tapered optical elements 1514 within the ferrule 1508 have the same coupling tip dimensions. In other embodiments, one or more of the tapered optical elements 1514 may be larger or smaller than others within the same ferrule 1508.

Figure 15G:
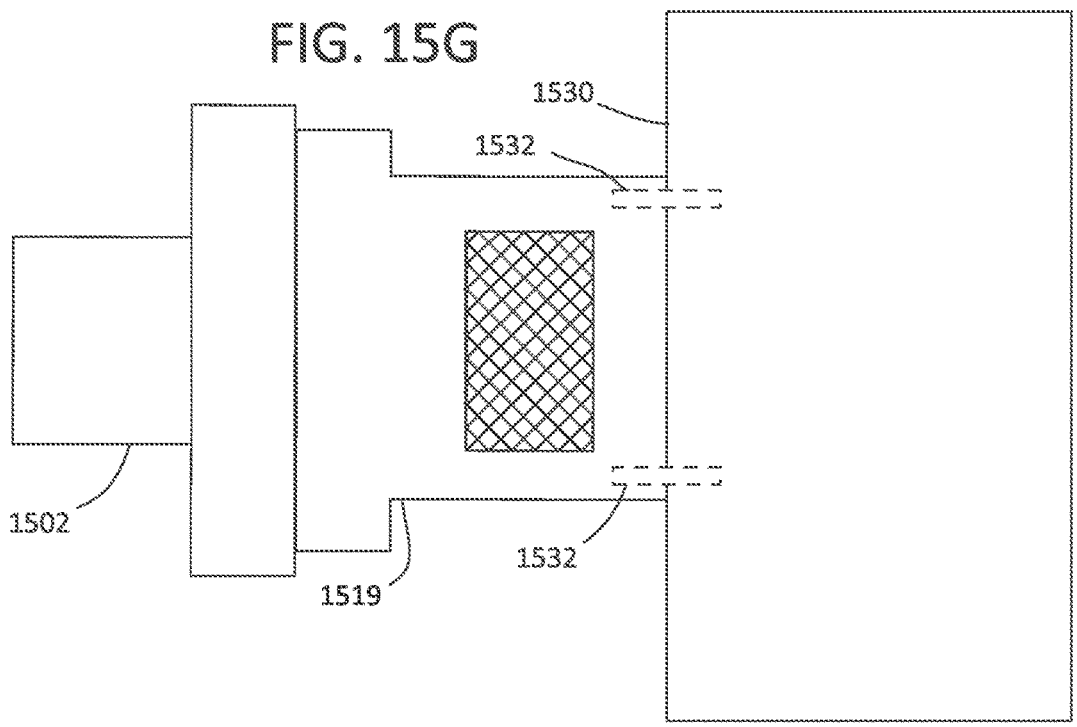
FIG. 15G schematically illustrates the multi-fiber holder for fibers of FIG. 15F attached to an optical chip, according to an embodiment of the invention.

If the multi-fiber coupling device 1519 is to be used for coupling to an optical chip 1530, as schematically illustrated in FIG. 15G, the optical chip substrate and the device 1519 may be provided with alignment elements to ensure the correct alignment of the tapered optical elements 1514 with the waveguides in the PIC. For example, in some embodiments, the device 1519 may include an MPO ferrule 1508, which is provided with guide pins 1532. In such a case, the optical chip 1530 to which it is to be mated may be provided with acceptance holes suitable positioned for correct alignment with the waveguides of the chip 1530. The multi-fiber coupling device 1519 may be attached to the chip using an adhesive, such as a uv cured adhesive.

Figure 16A:
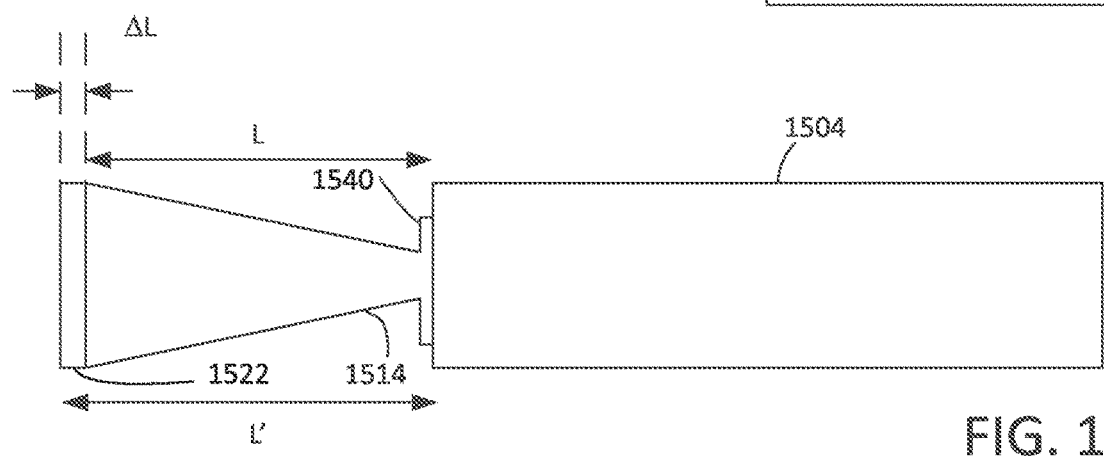
FIGS. 16A and 16B schematically illustrate tapered optical elements, formed with an excess length that may be removed during manufacture of a multi-fiber holder for fibers terminated using tapered optical elements, according to an embodiment of the invention.
Figure 16B:
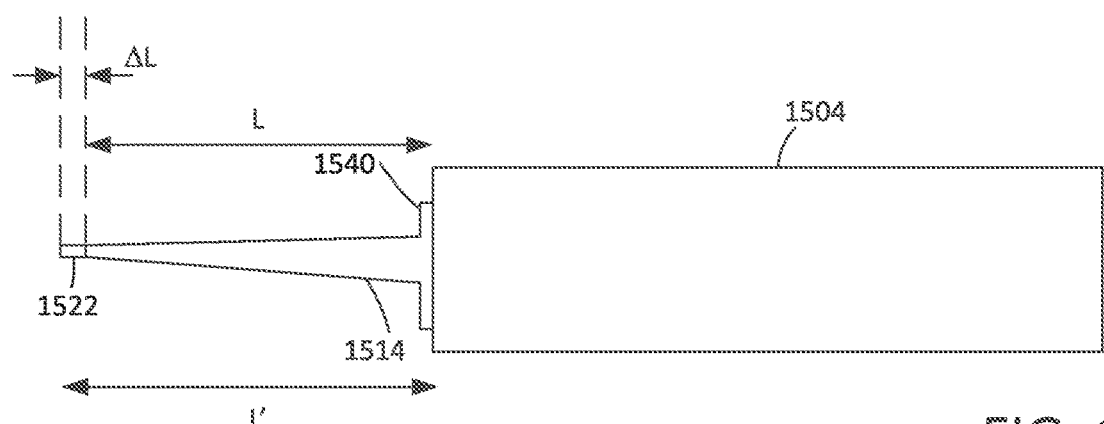

The step of polishing the ends of the tapered optical elements 1514 may remove some material from the tapered optical elements 1514. In some embodiments, the tapered optical elements may be printed with an excess of material at the coupling tip that is provided for polishing off so that, once the polishing process has completed, the tapered optical elements 1514 have the desired length. FIG. 16A schematically illustrates an embodiment of a tapered optical element 1514, having an up-tapered profile, on the end of a fiber 1504. In the illustrated embodiment, the tapered optical element 1514 has a pedestal base 1540 printed on the end of the fiber 1504. The desired length of the tapered optical element is shown as L, whereas the tapered optical element 1514 is fabricated with a length of L', where ΔL=L'−L is the excess material 1522 provided for removal during polishing. An embodiment of a tapered optical element 1514 having a down-tapered profile is shown in FIG. 16B. In some embodiments, when the fibers are drawn inside the ferrule 1508, for example as illustrated in FIG. 15E, only the excess material 1522 protrudes beyond the end surface 1512 of the ferrule 1508, and is available for polishing.

Another embodiment of multi-fiber coupling that implements the use of tapered optical elements on the end of single mode fibers is now described with reference to FIGS. 17A-17E. This embodiment uses an alignment block 1702, an embodiment of which is schematically illustrated in plan view in FIG. 17A and side view in FIG. 17B. In some embodiments, the alignment block may be formed of a glass, but may also be formed of other materials, such as ceramic or crystalline materials, including crystalline semiconductor materials such as silicon. The alignment block 1702 is provided with alignment grooves 1704 that receive optical fibers. In some embodiments, the alignment grooves 1704 may have a V-shaped profile, although other profile shapes may also be used.

Figure 17C:
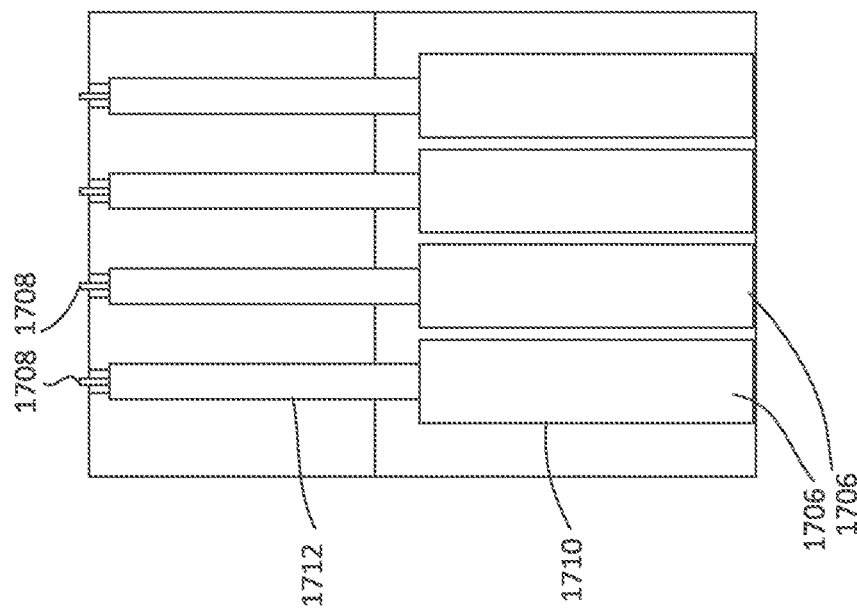
FIGS. 17A-17E schematically illustrate various steps in manufacturing a multi-fiber holder for fibers terminated using tapered optical elements, using a multi-fiber alignment block according to an embodiment of the invention.
Figure 17B:
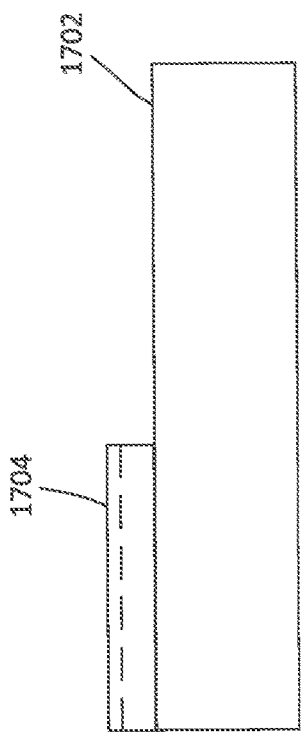
Figure 17A:
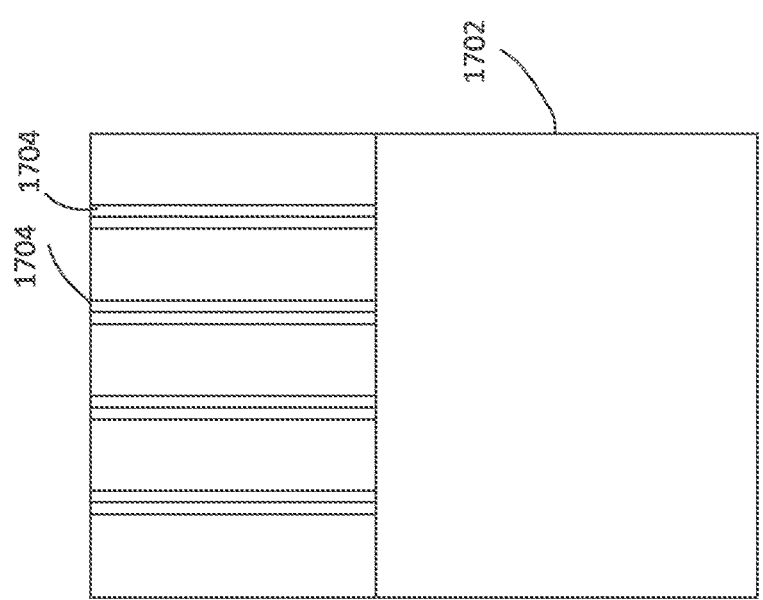

Fibers 1706 are placed in the alignment grooves 1704, as schematically illustrated in FIG. 17C. In some embodiments, the fibers 1706 have had their covering 1710 removed to expose the cladding 1712 at their ends, and the cladding 1712 sits in the alignment grooves 1704. The fibers 1706 are provided with tapered optical elements 1708 at their ends, preferably prior to being installed in the alignment grooves 1704. In some embodiments the fibers 1706 may be positioned within the alignment grooves 1704 so that the tapered optical elements 1708 slightly overhang the end face 1714 of the alignment block 1702, as shown in FIG. 17C, preferably by an amount equal to the length of excess material added at the ends of the tapered optical elements 1708. In other embodiments, the fibers 1706 may be positioned within the alignment grooves 1704 so that the coupling ends of the tapered optical elements 1708 are flush with the end face 1714 of the alignment block.

Figure 17E:
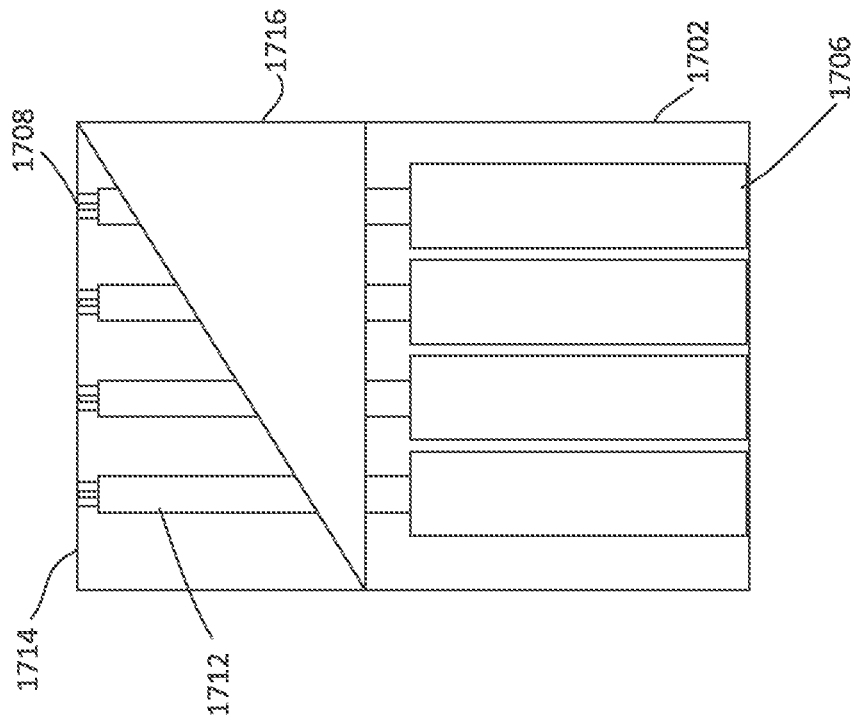
Figure 17D:
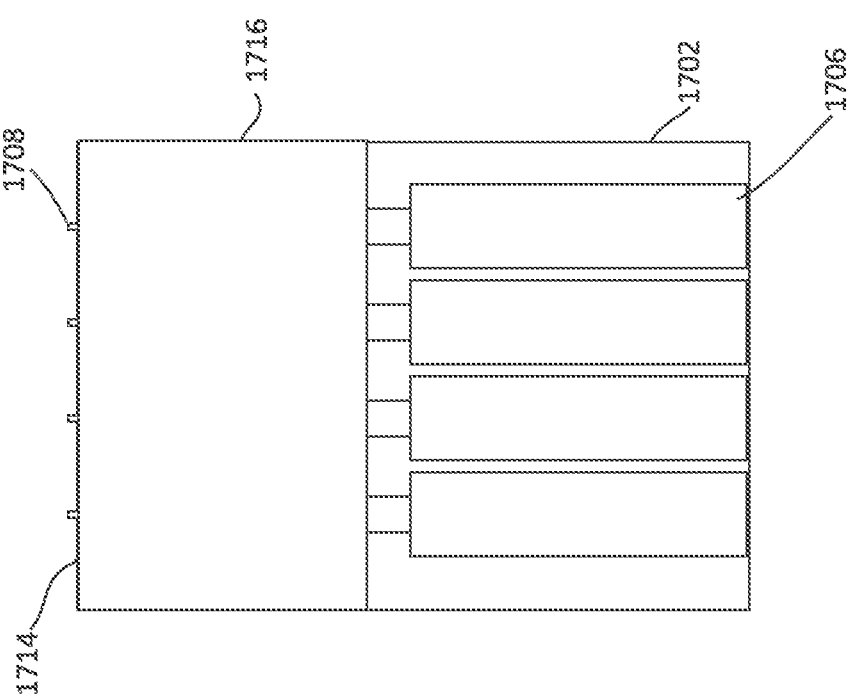

A cover 1716 may be placed over the exposed claddings 1712 of the fibers 1706, as is schematically illustrated in FIG. 17D. In some embodiments, the cover 1716 is placed over the exposed claddings 1712 after an adhesive has been placed over the claddings and the area of the alignment block 1702. In other embodiments, the cover 1716 may be placed over the claddings 1712 and then an adhesive is allowed to wick into the alignment grooves 1704. The adhesive may be any suitable adhesive, such as a low viscous, UV curable adhesive, for example OPTOCAST™ 3553-LV-UTF-HW uv-curable epoxy, available from Electronic Materials Inc., Breckenridge, Colorado, GA700H, available from NTT-Advanced Technology Corp., East Palo Alto, California or NOA 60 available from Norland, Cranbury, New Jersey The cover 1716 may be formed of any suitable materials, including a glass, ceramic or crystalline material such as a semiconductor crystalline material. In some embodiments, the cover 1716 may be formed of the same material as the alignment block 1702. The adhesive may wick into the spaces between the fiber and the alignment block 1702 and the cover 1716, and thus become a cladding for the tapered optical elements 1708.

The end face 1714 of the alignment block 1702 may then be polished to ensure that it is flat and to remove any portions of the tapered optical elements 1708 that overhang the end face 1714 of the alignment block 1702, as is schematically illustrated in FIG. 17E. Note that a portion of the cover 1716 has been omitted in this figure to show that the coupling tips of the tapered optical elements 1708 are flush with the end face 1714 of the alignment block. In those embodiments where the polishing step removes material from the tapered optical elements 1708, the tapered optical elements 1708 may have originally been printed with some excess material at their coupling ends, as was discussed above with reference to FIGS. 16A and 16B.

Figure 17F:
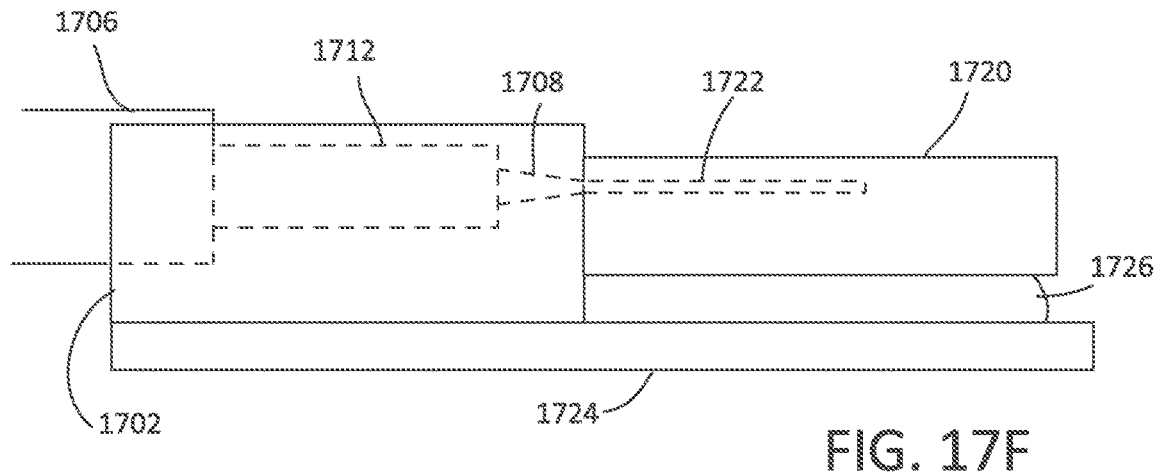
FIG. 17F schematically illustrates the multi-fiber holder of FIG. 17E coupling fibers to an optical chip, according to an embodiment of the invention.

In some embodiments, the alignment block 1702 may be positioned adjacent the optical chip 1720 so that the tapered optical element 1708 butt-couple to the waveguides 1722 of the optical chip 1720. An exemplary embodiment of such a configuration is schematically illustrated in FIG. 17F, which shows a side view of the alignment block 1702 and optical chip 1720 mounted to a base 1724. The alignment block 1702 and the optical chip 1720 may be attached to the base 1724 using any suitable method, including adhesive, such as a UV curable adhesive. In some embodiments, the adhesive 1726 may be applied in such a thickness as to achieve vertical alignment of the tapered optical elements 1708 and the chip waveguides 1722 relative to the base 1724.

Figure 18D:
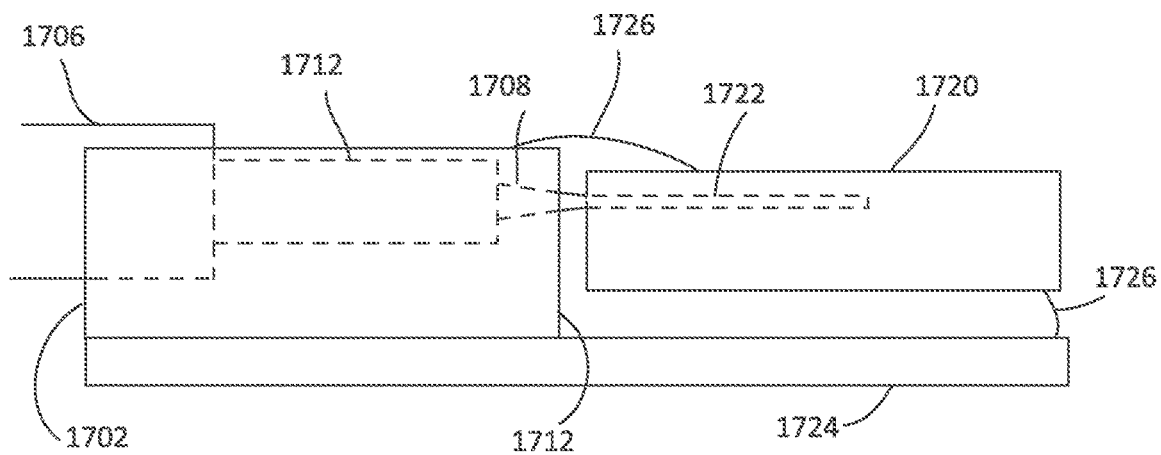
FIGS. 18C and 18D schematically illustrate the multi-fiber holder of FIG. 18B coupling fibers to an optical chip, according to another embodiment of the invention.

Another approach to coupling multiple fibers to an optical chip using tapered optical elements is described with reference to FIGS. 18A-18D. In this embodiment, fibers 1706 are placed in alignment grooves of the alignment block 1702 and secured in place, for example using an adhesive and/or using a cover 1716, as is schematically illustrated in FIG. 18A. The end face 1714 of the alignment block 1702 may then be polished to ensure that the ends of the fibers 1706 are flush with the end 1714.

Figure 18B:
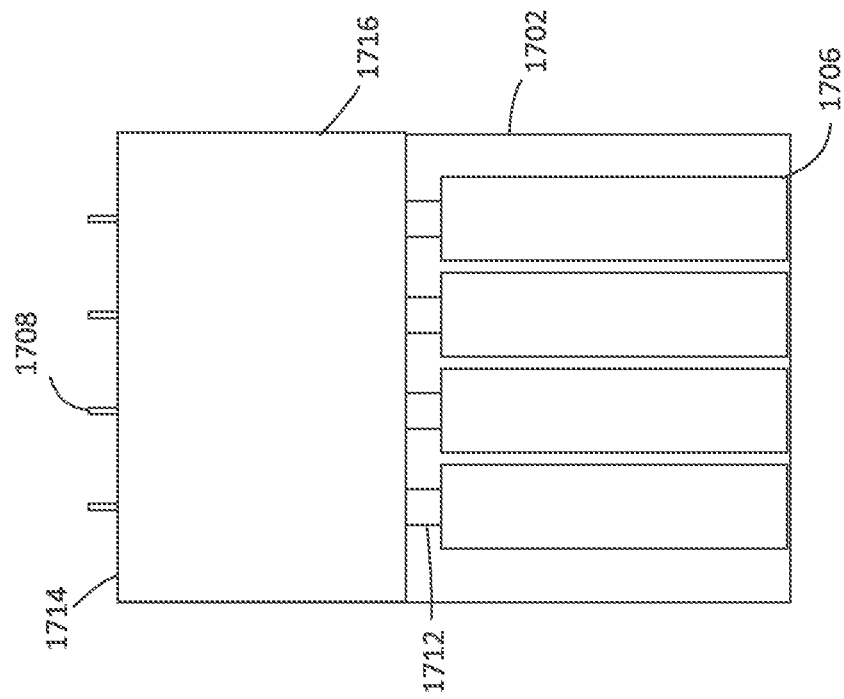
FIGS. 18A-18B schematically illustrate various steps in manufacturing a multi-fiber holder for fibers terminated using tapered optical elements, using a multi-fiber alignment block, according to another embodiment of the invention.
Figure 18A:
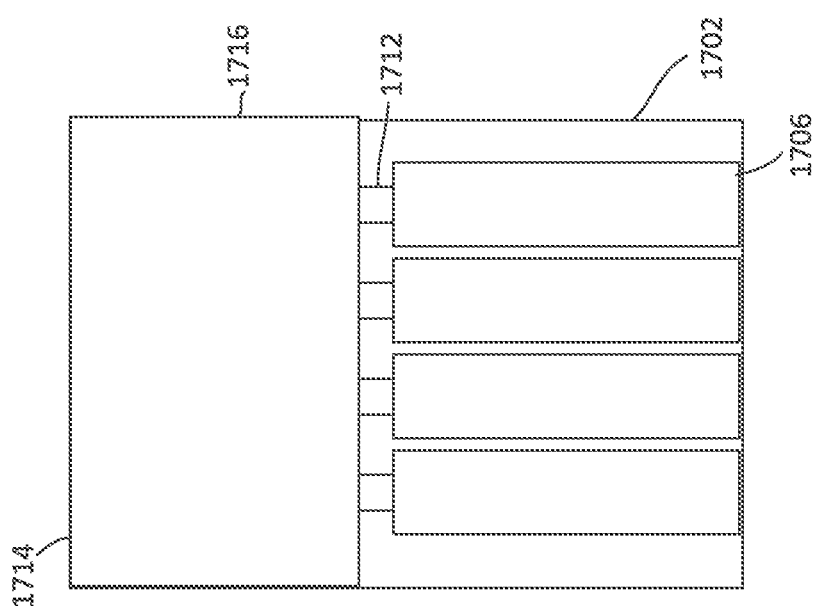

Tapered optical elements 1708 may then be printed onto the ends of the fibers 1706, in a manner like that discussed hereinabove, as is schematically illustrated in FIG. 18B, so that the tapered optical elements 1708 are overhanging the end face 1714 of the alignment block.

Figure 18C:
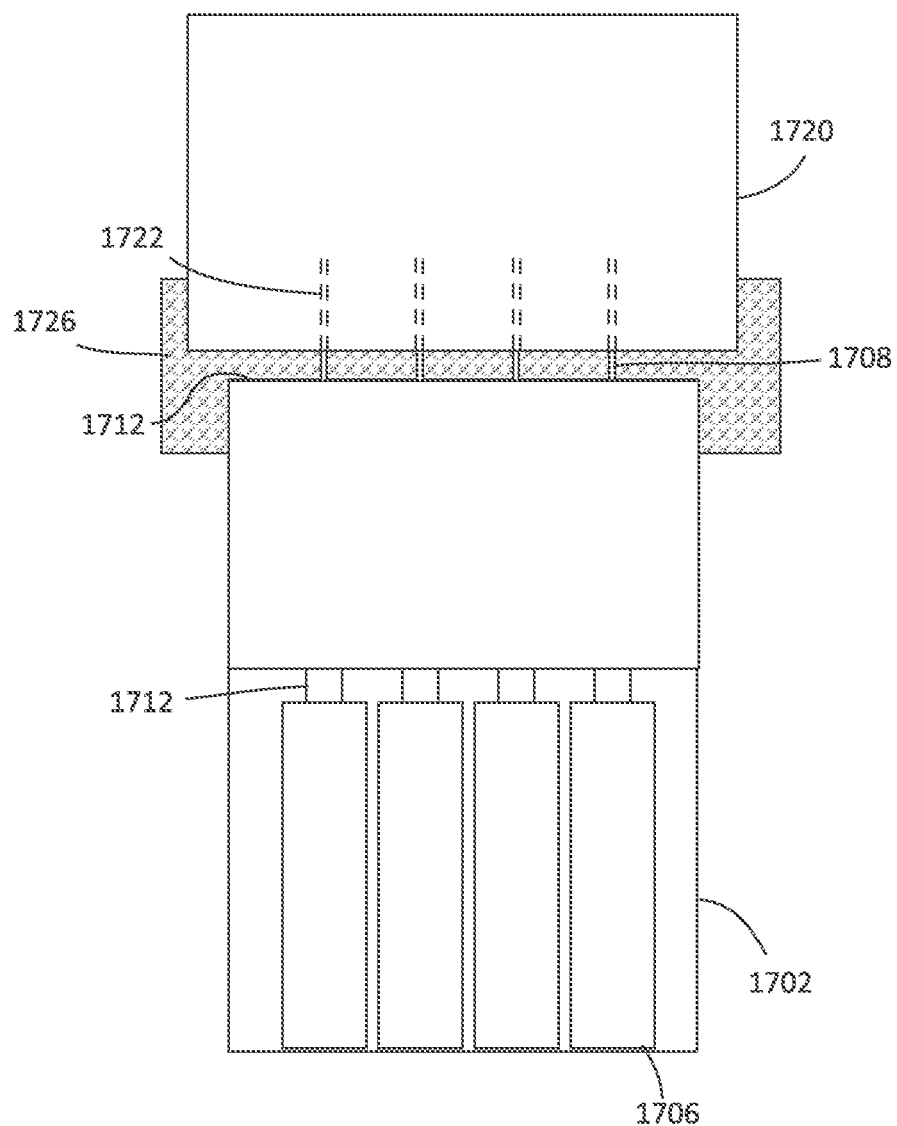

The alignment block 1702 and the optical chip 1720 may then be brought close together, so that the tapered optical elements 1708 align, and are in contact, with the waveguides 1722 of the optical chip 1720. The gap 1728 between the alignment block 1702 and the chip 1720 may then be filled with an adhesive 1726 and cured so that the alignment block 1702 chip 1720 remain in the same relative position, as shown in FIG. 18C. An embodiment of a cured device, comprising an alignment block 1702 and optical chip 1720 adhered together on a base 1724, where the tapered optical elements 1708 overhang the end face 1714 of the alignment block, is schematically illustrated in FIG. 18D.

Figure 19A:
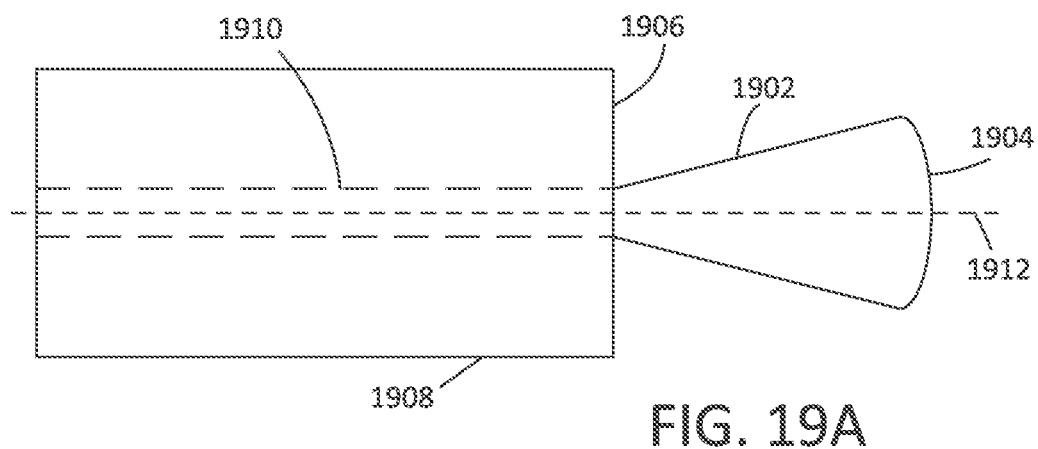
FIGS. 19A-19C schematically illustrate embodiments of optical element having a curved output face, according to the present invention.

Other embodiments of optical elements may be employed in addition to those discussed above. For example, a tapered optical element may be provided with a curved output surface instead of a flat output surface, so that divergence of the light exiting or entering the element is changed. An embodiment of a tapered optical element 1902 having a curved output surface 1904 is schematically illustrated in FIG. 19A. The tapered optical element 1902 is printed on the end face 1906 of a fiber 1908 that has a core 1910. The core 1910 and the tapered optical element 1902 may be centered on an axis 1912 of the fiber 1908. In the illustrated embodiment, the tapered optical element 1902 is up-tapered. The curved output surface 1904 has a center of curvature to the left of the surface 1904, i.e., has a positive optical power, so that light propagating to the right, out of the tapered optical element 1902, is converged towards the axis 1912. The optical power of the curved output surface 1904 may be selected for a particular application. In some embodiments, the curved output surface 1904 may have a negative power. While the illustrated embodiment of tapered optical element 1902 is not shown to include a pedestal base, a pedestal base may be present in some embodiments.

Figure 19B:
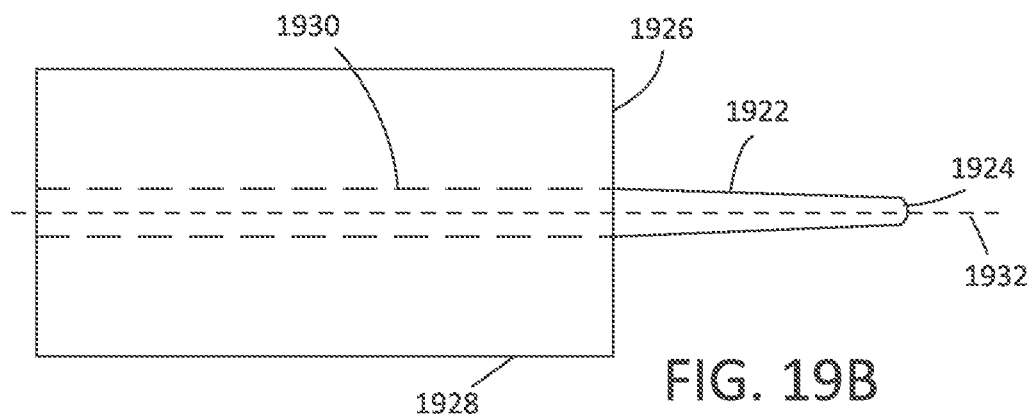

Another embodiment of tapered optical element 1922 having a curved output surface 1924 is schematically illustrated in FIG. 19B. The tapered optical element 1922 is printed on the end 1926 of a fiber 1928 that has a core 1930. The core 1930 and the tapered optical element 1922 may be centered on an axis 1932 of the fiber 1928. In the illustrated embodiment, tapered optical element 1922 is down-tapered. In other embodiments, the optical element 1902 may have sidewalls parallel to the optical axis 1932.

Figure 19C:
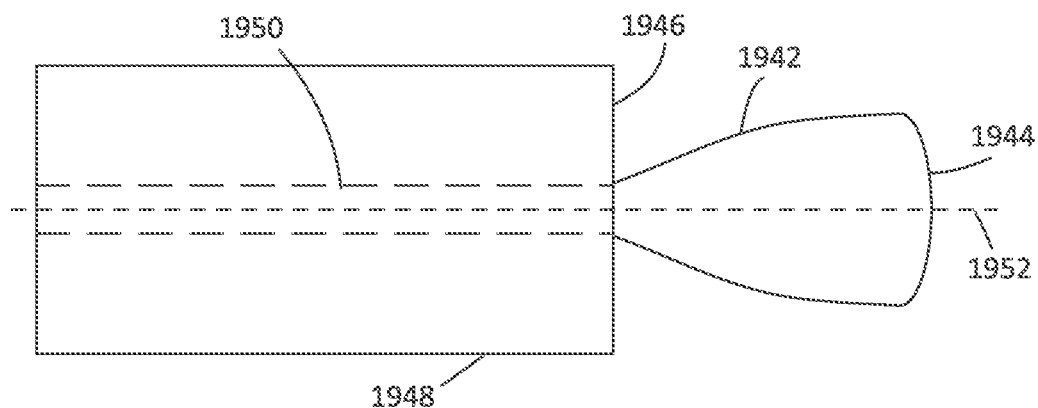

Another embodiment of tapered optical element 1942 having a curved output surface 1944 is schematically illustrated in FIG. 19C. In the illustrated embodiment, the tapered optical element 1942 has a thick nonlinear taper. The tapered optical element 1942 is printed on the end 1946 of a fiber 1948 that has a core 1950. The core 1950 and the tapered optical element 1942 may be centered on an axis 1952 of the fiber 1948. In the illustrated embodiment, tapered optical element 1942 is up-tapered. In other embodiments, the non-linearly tapered optical element 1942 may be down-tapered.

Figure 20A:
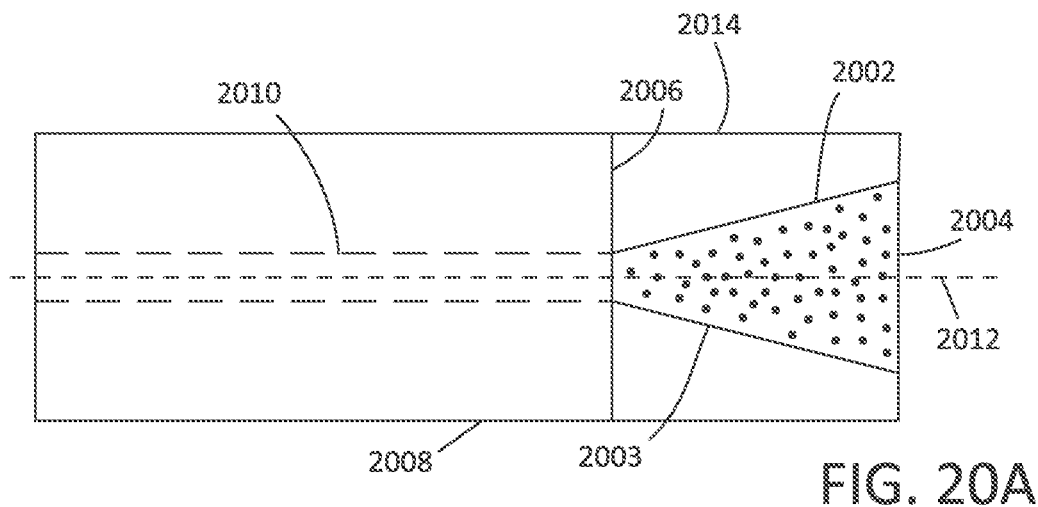
FIGS. 20A-20C schematically illustrate embodiments of optical element having a graded index, according to the present invention.

Some embodiments of printed optical element may include spatial variations in the refractive index. For example, where the printed optical element has a refractive index profile that has a higher refractive index on-axis than off-axis, in other words it has a refractive index gradient in a direction that is perpendicular to its axis, then the printed element may operate as a gradient-index (GRIN) element. One embodiment of a GRIN printed tapered optical element 2002 is schematically illustrated in FIG. 20A. The tapered optical element 2002, having tapered sidewalls 2003, is printed on the end 2006 of a fiber 2008 that has a core 2010. The core 2010 and the tapered optical element 2002 are centered on an axis 2012 of the fiber 2008. The tapered optical element 2002 has an output face 2004, which may be flat, as illustrated, or curved to provide optical power to the light exiting the tapered optical element 2002. In some embodiments, the tapered optical element 2002 may be provided with a cladding 2014. In the illustrated embodiment, the tapered optical element 2002 has a linear up-taper. In other embodiments, the tapered element may have a down-taper and the taper may be nonlinear. While the material of the tapered optical element 2002 contains a graded index, the tapered optical element 2002 may operate as a waveguide between its fiber end and the output face 2004, for light propagating therethrough.

The refractive index of the printed material may be varied by altering the writing speed and/or the writing power. This is described, for example, in Zukauskas A. et al., "Tuning the refractive index in 3D direct laser writing lithography: towards GRIN microoptics," Laser Photonics Rev. (2015) 9 706-712, DOI 10.1002/lpor.201500170, incorporated herein by reference. A greater refractive index is obtained when the degree of conversion (DC, the percentage of carbon double bonds that are consumed during the polymerization process) is higher, which is obtained by exposing the material to more light. Thus, by increasing the DC in those volume elements (voxels) of the tapered optical element 2002 where it is intended that the refractive index be increased, a desired 3D refractive index profile may be obtained in the tapered optical element 2002.

Figure 20B:
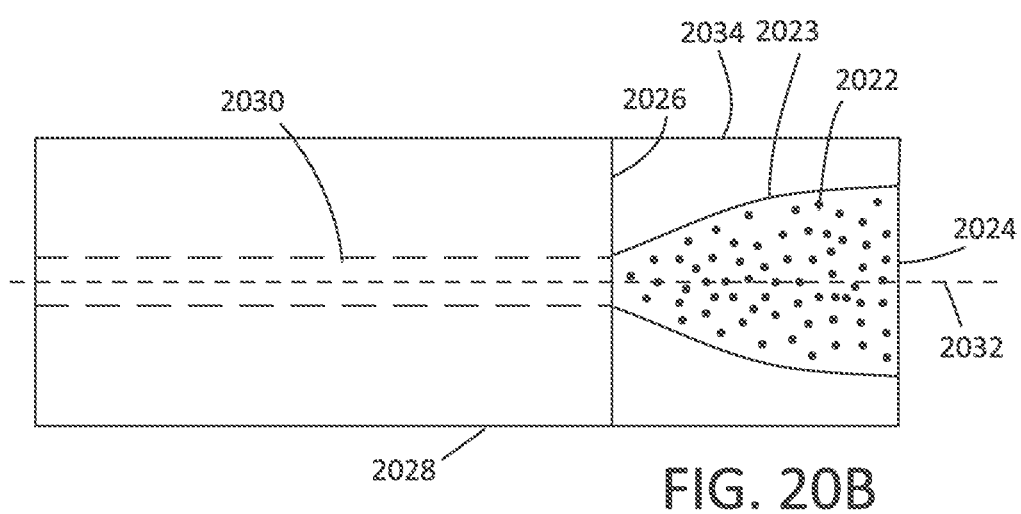

Another embodiment of a GRIN printed tapered optical element 2022 is schematically illustrated in FIG. 20B. The tapered optical element 2022, having tapered sidewalls 2023, is printed on the end 2026 of a fiber 2028 that has a core 2030. The core 2030 and the tapered optical element 2022 are centered on an axis 2032 of the fiber 2028. The tapered optical element 2022 has an output face 2024, which may be flat, as illustrated, or curved to provide optical power to the light exiting the element 2022. In some embodiments, the tapered optical element 2022 may be provided with a cladding 2034. In the illustrated embodiment, the tapered optical element 2022 has a thick nonlinear up-taper. Other embodiments may include a thin nonlinear up-taper, or may include a nonlinear down-taper.

Figure 20C:
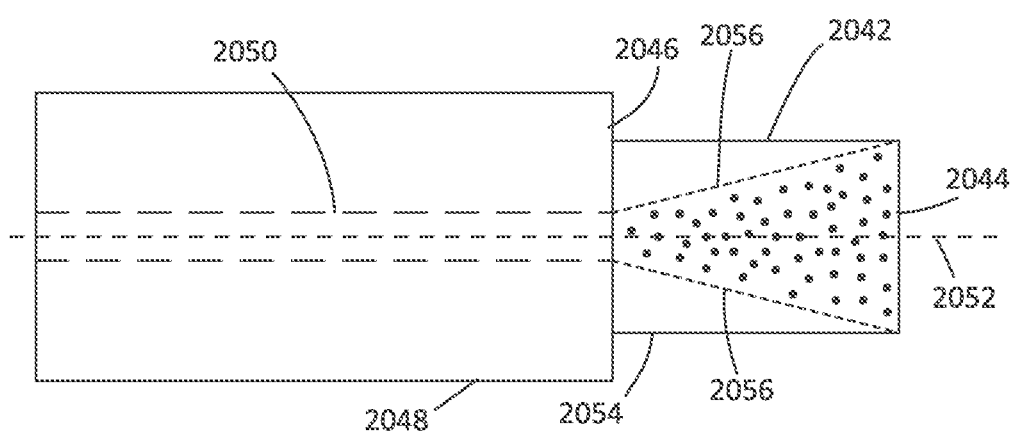

Another embodiment of a GRIN printed tapered optical element 2042 is schematically illustrated in FIG. 20C. The tapered optical element 2042 is printed on the end 2046 of a fiber 2048 that has a core 2050. The core 2050 and the printed optical element 2042 are centered on an axis 2052 of the fiber 2048. The tapered optical element 2042 has an output face 2044, which may be flat, as illustrated, or curved to provide optical power to the light exiting the element 2042. In the illustrated embodiment, the divergence of the light exiting the fiber 2048 is controlled by the GRIN properties of the tapered optical element 2042, rather than being confined by the sidewalls 2054 of the element 2042. The sidewalls 2054 of the element 2042 may be substantially parallel to the axis 2052.

The graded index profile may be present throughout the entirety of the tapered optical element 2042 or, as in the illustrated embodiment, the graded index profile may be restricted to that portion of the tapered optical element 2042 which light from the fiber 2048 will pass through. The dashed lines 2056 indicate the expected divergence of the light from the fiber 2048, and the GRIN material is found between the dashed lines 2056. Since the slower writing speed associated with voxels of relatively high refractive index increases the length of time required to manufacture the tapered optical element 2042, this approach reduces the costs of making the element 2042, as it avoids writing GRIN voxels where the light from the fiber 2048 does not pass through.

The description of the coupling devices is primarily described in terms of optical signals propagating from the fiber to the optical chip. It should be understood that the embodiments of the invention described herein operate for light propagating both from the fiber to the chip and from the chip to the fiber, and there is no intention in the present description to limit the direction in which optical signals propagate through the claimed optical devices, unless otherwise stated.

As noted above, the present invention is applicable to fiber optical communication and data transmission systems. Accordingly, the present invention should not be considered limited to the particular examples described above, but rather should be understood to cover all aspects of the invention as fairly set out in the attached claims.

LIST OF NUMBERED ELEMENTS

100 Coupling arrangement
102 Tapered optical element
104 Fiber
106 Fiber core

| | |
|---|---|
| 108 Pedestal base | 1310 Curve |
| 110 End facet | 1402 Curve |
| 112 Tapered section | 1404 Curve |
| 113 Fiber end | 1502 Fiber ribbon cable |
| 114 Coupling end | 1504 Fibers |
| 116 Waveguide | 1506 Dotted line |
| 118 Optical chip | 1508 Ferrule |
| 300 Tapered optical element | 1510 Ends |
| 302 Coupling end | 1512 End surface |
| 304 Fiber end | 1514 Tapered optical elements |
| 400 Tapered optical element | 1516 Adhesive |
| 402 Circular coupling end | 1518 Window |
| 404 Circular fiber end | 1519 Multi-fiber coupling device |
| 410 Tapered optical element | 1520 Fiber clamp |
| 412 Square coupling end | 1522 Excess material |
| 414 Circular fiber end | 1530 Chip |
| 420 Tapered optical element | 1532 Guide pins |
| 422 Rectangular coupling end | 1540 Pedestal base |
| 424 Circular fiber end | 1702 Alignment block |
| 430 Tapered optical element | 1704 Alignment grooves |
| 432 Coupling end | 1706 Fibers |
| 434 Circular fiber end | 1708 Tapered optical elements |
| 500 Fiber | 1710 Covering |
| 502 Core | 1712 Cladding |
| 504 Output face | 1714 End face |
| 506 Tapered optical element | 1716 Cover |
| 508 Fiber end | 1720 Chip |
| 510 Coupling end | 1722 Waveguides |
| 600 Linear taper profile | 1724 Base |
| 602 Nonlinear taper profile | 1726 Adhesive |
| 604 Nonlinear taper profile | 1902 Optical element |
| 700 Linear taper | 1904 Curved output surface |
| 702 Thick nonlinear taper | 1906 End face |
| 704 Thin nonlinear taper | 1908 Fiber |
| 900 Set up for dip-in laser lithography | 1910 Core |
| 902 Polished end facet | 1912 Axis |
| 904 Fiber | 1922 Tapered optical element |
| 906 Liquid resist | 1924 Curved output surface |
| 908 Light | 1926 End |
| 910 Focusing unit | 1928 Fiber |
| 912 Focal point | 1930 Core |
| 914 Lens axis | 1932 Axis |
| 916 Focal plane | 1942 Tapered optical element |
| 1102 Curve | 1944 Curved output surface |
| 1104 Dot-dashed line | 1946 End |
| 1106 Sloped line | 1948 Fiber |
| 1108 Point showing measured MFD | 1950 Core |
| 1200 Set-up | 1952 Axis |
| 1202 Light source | 2002 Tapered optical element |
| 1204 First fiber | 2004 Output face |
| 1206 First fiber coupler | 2006 End |
| 1208 Fiber-coupled polarization controller | 2008 Fiber |
| 1210 Second fiber coupler | 2010 Core |
| 1212 Fiber | 2012 Axis |
| 1214 Translation stage | 2014 Cladding |
| 1216 PIC | 2022 Tapered optical element |
| 1218 Translation controller | 2024 Output face |
| 1220 Second fiber | 2026 End |
| 1222 Second translation stage | 2028 Fiber |
| 1224 Third fiber coupler | 2030 Core |
| 1226 Fiber | 2032 Axis |
| 1228 Fiber-coupled power meter | 2034 Cladding |
| 1250 Set-up | 2042 Tapered optical element |
| 1302 Curve (circles) | 2044 Output face |
| 1304 Curve (diamonds) | 2046 End |
| 1306 Curve (squares) | 2048 Fiber |
| 1308 Curve (6-pointed star) | 2050 Core |

2052 Axis
2054 Sidewalls
2056 Dashed lines

What is claimed is:

1. A fiber-coupled optical chip device, comprising
a first optical fiber, the first optical fiber having a first end;
a first down-tapered optical element 3D printed on the first end of the first optical fiber, the first down-tapered optical element having a fiber end proximate the first end of the first optical fiber and a coupling end distal from the fiber end;
an optical chip having a first waveguide configured for edge coupling;
wherein the coupling end of the first down-tapered optical element is aligned with the first waveguide of the optical chip; and
wherein the fiber end of the first down-tapered optical element comprises a first cross-sectional shape and the coupling end of the first down-tapered optical element comprises a second cross-sectional shape different from the first cross-sectional shape.

2. The device as recited in claim 1, wherein the first down-tapered optical element comprises a linear taper profile.

3. The device as recited in claim 1, wherein the first down-tapered optical element comprises a nonlinear taper profile.

4. The device as recited in claim 3, wherein the nonlinear taper profile is a thick nonlinear taper profile.

5. The device as recited in claim 1, wherein the first cross-sectional shape is circular.

6. The device as recited in claim 5, wherein the second cross-sectional shape is elliptical.

7. The device as recited in claim 1, wherein the first down-tapered optical element comprises a base pedestal 3D printed on the first end of the first optical fiber.

8. The device as recited in claim 1, further comprising a second optical fiber having a second fiber end, a second down-tapered optical element 3D printed on the second end of the second optical fiber, the second down-tapered optical element having a fiber end proximate the second end of the second optical fiber and a coupling end distal from the fiber end;
wherein the optical chip has a second waveguide configured for edge coupling;
wherein the coupling end of the second down-tapered optical element is aligned with the second waveguide.

9. The device as recited in claim 8, wherein the first end of the first optical fiber and the second end of the second optical fiber are aligned with the chip by a multi-fiber alignment element.

10. A fiber optic device, comprising:
an optical fiber having a first end face and a core; and
a tapered optical element 3D printed on the first end face of the optical fiber, the tapered optical element having a fiber end and a coupling end, the fiber end of the tapered optical element being aligned with the core of the optical fiber;
the fiber end of the tapered optical element having a first cross-sectional shape and the coupling end of the tapered optical element having a second cross-sectional shape different from the first cross-sectional shape.

11. The device as recited in claim 10, wherein the tapered optical element is a down-tapered optical element.

12. The device as recited in claim 10, wherein the first cross-sectional shape is circular.

13. The device as recited in claim 10, wherein the second cross-sectional shape is one of elliptical, rectangular, square and triangular.

14. The device as recited in claim 10, further comprising a photonic integrated circuit (PIC) having a first waveguide terminating proximate an edge of the PIC, the coupling end of the tapered optical element being aligned with the first waveguide thereby permitting light to couple between the first waveguide and the optical fiber.

15. An optical device for coupling an optical signal, comprising:
an optical fiber having a fiber core and an end face; and
a tapered optical element 3D printed on the end face of the optical fiber, the tapered optical element having a fiber end aligned with the fiber core proximate the optical fiber and a coupling end distal to the optical fiber;
wherein the tapered optical element has an output face at the coupling end, the output face is curved to alter divergence of light passing through the output face; and
wherein the tapered optical element acts as a waveguide for the optical signal after the optical signal has propagated into the tapered optical element from the fiber core.

16. The optical device as recited in claim 15, wherein the output face is characterized by a positive optical power for light passing through the output face.

17. The optical device as recited in claim 15, wherein the waveguiding tapered optical element has a linear taper.

18. The optical device as recited in claim 15, wherein the waveguiding tapered optical element has a nonlinear taper.

19. The optical device as recited in claim 15, wherein the waveguiding tapered optical element has a down-taper profile.

20. The optical device as recited in claim 15, further comprising a waveguide disposed to receive the optical signal from the tapered optical element.

* * * * *